United States Patent
Brucker et al.

(10) Patent No.: US 10,969,290 B2
(45) Date of Patent: Apr. 6, 2021

(54) ANODE ELECTRODE SHIELD FOR INVERTED MAGNETRON COLD CATHODE IONIZATION GAUGE

(71) Applicant: MKS Instruments, Inc., Andover, MA (US)

(72) Inventors: Gerardo A. Brucker, Longmont, CO (US); Timothy C. Swinney, Fort Collins, CO (US)

(73) Assignee: MKS Instruments, Inc., Andover, MA (US)

(*) Notice: Subject to any disclaimer, the term of this patent is extended or adjusted under 35 U.S.C. 154(b) by 373 days.

(21) Appl. No.: 15/834,625

(22) Filed: Dec. 7, 2017

(65) Prior Publication Data
US 2018/0164176 A1    Jun. 14, 2018

Related U.S. Application Data

(60) Provisional application No. 62/433,320, filed on Dec. 13, 2016.

(51) Int. Cl.
| | |
|---|---|
| *G01L 21/34* | (2006.01) |
| *H01J 41/06* | (2006.01) |
| *G01L 19/06* | (2006.01) |

(52) U.S. Cl.
CPC ............ *G01L 21/34* (2013.01); *G01L 19/06* (2013.01); *H01J 41/06* (2013.01)

(58) Field of Classification Search
CPC .. G01L 19/06; G01L 21/34; H01J 9/50; H01J 41/06; Y10T 29/49007; Y02W 30/828
(Continued)

(56) References Cited

U.S. PATENT DOCUMENTS

| 5,317,270 A | 5/1994 | Lethbridge |
| 6,474,171 B1 * | 11/2002 | Holme .................... G01L 21/34 73/753 |

(Continued)

FOREIGN PATENT DOCUMENTS

| GB | 638178 A | 5/1950 |
| GB | 2256310 A | 2/1992 |

(Continued)

OTHER PUBLICATIONS

Notification of Transmittal of the International Search Report and the Written Opinion of the International Searching Authority, or the Declaration, PCT/US2017/065130, entitled "Anode Electrode Shield for Inverted Magnetron Cold Cathode Ionization Gauge," dated Feb. 20, 2018.

(Continued)

*Primary Examiner* — Nasima Monsur
*Assistant Examiner* — Rahul Maini
(74) *Attorney, Agent, or Firm* — Hamilton, Brook, Smith & Reynolds, P.C.

(57) ABSTRACT

A cold cathode ionization gauge (CCIG) includes an extended anode, a cathode surrounding the anode along a length of the anode, and a feedthrough insulator supporting the anode. The cathode forms a discharge space around the anode to enable formation of a plasma between the anode and the cathode and a resultant ion current flow into the cathode. The CCIG further includes a magnet applying a magnetic field through the discharge space to lengthen free electron paths to sustain the plasma. A shield is electrically isolated from the insulator and shields the insulator from electrons of the plasma. The shield may be mounted to the cathode and surrounds and is spaced from the anode. An electric controller applies voltage between the anode and the cathode to create ionization with plasma discharge between (Continued)

the anode and the cathode, the controller determining pressure based on measured ion current flow to the cathode.

22 Claims, 24 Drawing Sheets

(58) Field of Classification Search
USPC .................................................. 324/460, 463
See application file for complete search history.

(56) References Cited

U.S. PATENT DOCUMENTS

| | | | |
|---|---|---|---|
| 7,456,634 | B2 | 11/2008 | Knott |
| 9,588,004 | B2 | 3/2017 | Brucker |
| 9,671,302 | B2 | 6/2017 | Brucker et al. |
| 2010/0259273 | A1 | 10/2010 | Kawasaki et al. |
| 2011/0085276 | A1* | 4/2011 | Nishida .................. H01T 23/00 361/235 |
| 2014/0368210 | A1 | 12/2014 | Enomoto et al. |
| 2015/0091579 | A1* | 4/2015 | Brucker .................. G01L 19/06 324/460 |
| 2016/0025587 | A1 | 1/2016 | Andreaus et al. |
| 2016/0209288 | A1 | 7/2016 | Kelly et al. |

FOREIGN PATENT DOCUMENTS

| | | |
|---|---|---|
| JP | 2008-304361 A | 12/2008 |
| JP | 2014-048264 A | 3/2014 |
| WO | 2009019765 A1 | 2/2009 |
| WO | 2016115232 A2 | 7/2016 |

OTHER PUBLICATIONS

Notification Concerning Transmittal of International Preliminary Report on Patentability, dated Jun. 27, 2019, International Application No. PCT/US2017/065130 entitled "Anode Electrode Shield for Inverted Magnetron Cold Cathode Ionization Gauge".

Singapore Search Report for Application No. 11201905213S, dated Jun. 16, 2020.

* cited by examiner

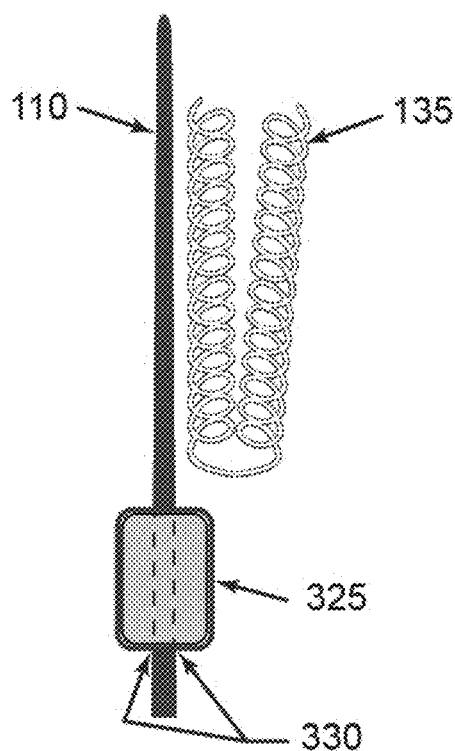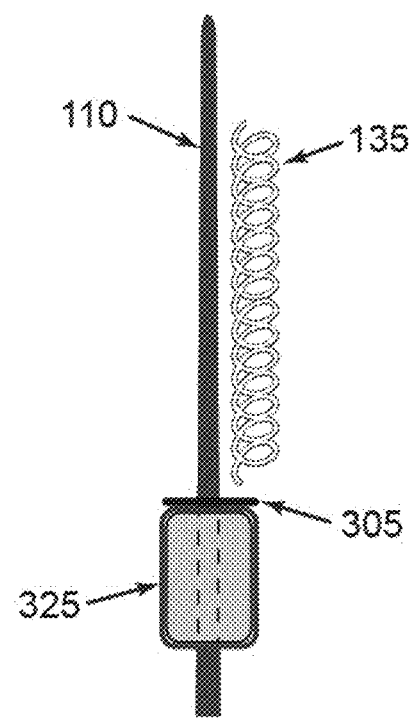
Higher Sensitivity
Lower Sensitivity
FIG. 3A
FIG. 3B

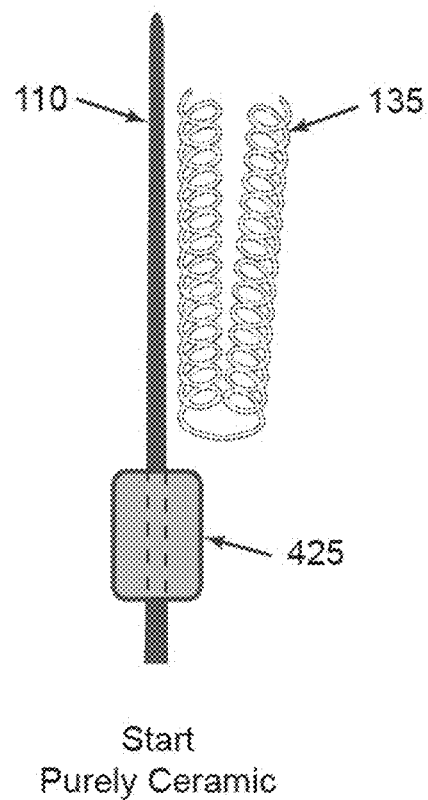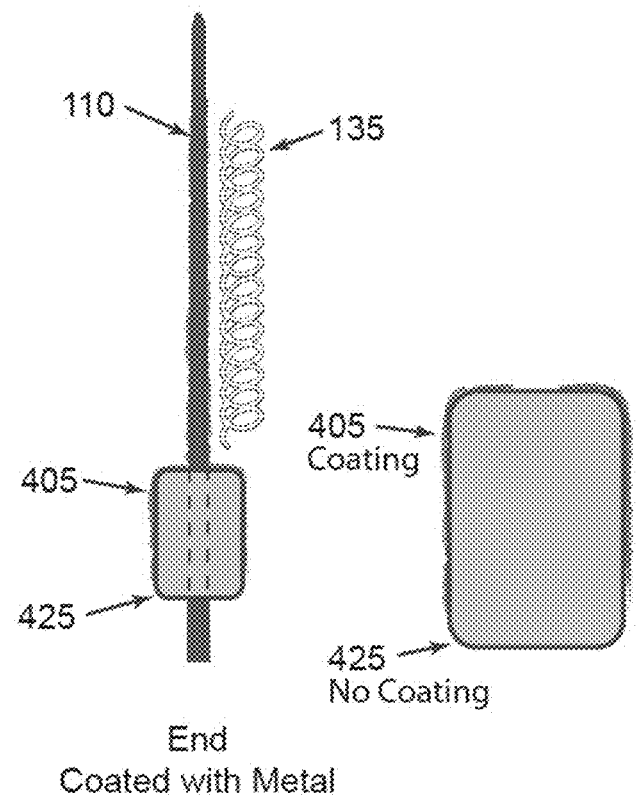
Start
Purely Ceramic
End
Coated with Metal
FIG. 4A
FIG. 4B
FIG. 4C 2 Legs 1 Leg 4 Legs

ANODE ELECTRODE SHIELD FOR INVERTED MAGNETRON COLD CATHODE IONIZATION GAUGE

RELATED APPLICATION

This application claims the benefit of U.S. Provisional Application No. 62/433,320, filed on Dec. 13, 2016. The entire teachings of the above application are incorporated herein by reference.

BACKGROUND

Cold cathode ionization vacuum gauges are well known. Three commonly known cold cathode ionization vacuum gauges include normal (noninverted) magnetron type gauges, inverted magnetron type gauges, and Philips (or Penning) gauges. All of these types of gauges have a pair of electrodes (i.e., an anode and a cathode) in an evacuated non-magnetic envelope which is connected to the vacuum to be measured. A high voltage DC potential difference is applied between the anode electrode and the cathode electrode to cause an electric field between the electrodes. A magnetic field is applied along the axis of the electrodes perpendicular to the electric field in order to increase free electron pathlengths to sustain a free electron plasma in which the electrons collide with neutral molecules and atoms to create ions. The positive ions move to the cathode electrode to maintain the discharge current at an equilibrium value which is a function of pressure.

A cold cathode ionization gauge (CCIG) provides an indirect measurement of vacuum system total pressure by first ionizing gas molecules and atoms inside its vacuum gauge envelope and then measuring the resulting ion current. The measured ion current is directly related to the gas density and gas total pressure inside the gauge envelope, i.e., as the pressure inside the vacuum system decreases, the measured ion current decreases. Gas specific calibration curves provide the ability to calculate total pressures based on ion current measurements.

The CCIG described herein relies on the inverted magnetron principle. The gauge is of cylindrical symmetry. A large voltage potential difference (i.e., radial electric field) between the anode pin (located at the axis) and the cathode cylindrical envelope provides energy to the electrons for the ionization events to occur. A crossed axial magnetic field provides the electron trajectory path length required to maintain a discharge inside the envelope. The discharge current is the measured quantity that is proportional to the pressure in the system.

The discharge is established through an avalanche ionization process that generally starts with a single electron being released into the ionization volume of the gauge. The process responsible for releasing an electron can include a field emission event or a cosmic ray ionization process. The avalanche process relies on the long path length for the electron trajectories that leads to many ionization processes per electron. Each ionization process releases a positive ion as well as an additional electron that is added into the discharge. As the ions collide with the cathode internal walls, additional electrons are also ejected into the discharge, thereby contributing to the total charge. The electrical discharge consisting of a free electron plasma and positive ions produces an ion current which is monotonically increasing with increasing pressure in the system, and likewise for decreasing variables.

SUMMARY

In accordance with the present invention, a CCIG that includes an anode and a cathode is provided with a shield at the cathode to shield a feedthrough insulator supporting the anode from electrons of the discharge plasma. In example embodiments, the shield may be incorporated into the cathode or may be a separate element mounted to the cathode.

A CCIG includes an extended anode, a cathode surrounding the anode along a length of the anode, and a feedthrough insulator supporting the anode. The cathode forms a discharge space around the anode to enable formation of a pure electron plasma between the anode and the cathode and a resultant ion current flow into the cathode. The gauge further includes a magnet applying a magnetic field through the discharge space to lengthen free electron paths to sustain the plasma. A shield is mounted to the cathode and is surrounding and spaced from the anode. The shield is electrically isolated from the insulator and shields the insulator from electrons of the plasma. An electric controller applies voltage between the anode and the cathode to create ionization with plasma discharge between the anode and the cathode, the controller determining pressure based on measured ion current flow to the cathode.

In embodiments of the CCIG, the shield can be spaced from the anode by a first spacing and spaced from the insulator by a second spacing greater than the first spacing, the first and second spacings enabling shielding of the insulator from electrons of the plasma.

The shield can include a plate having an aperture through which the anode extends. The aperture in the plate can be circular, in which case the first spacing can be determined by the radius of the aperture. The shield can further include a spacer adapted to provide the second spacing between the plate and the insulator. The spacer can include a leg that connects the shield to the cathode, and may include multiple legs that connect the shield to the cathode.

The shield can comprise a cup that surrounds the insulator, wherein the plate having the aperture is the base of the cup. The aperture in the base of the cup can be circular and the first spacing can be determined by the radius of the circular aperture.

In embodiments of the CCIG, the first spacing, between the shield and the anode, can be within a range of 0.9 to 2.7 millimeters (about 0.035 to 0.105 inches). The second spacing, between the shield and the insulator, can be within a range of 0.9 to 2.7 millimeters (about 0.035 to 0.105 inches).

A top portion of the feedthrough insulator may be covered with metal. For example, the metal may be metal that is coated onto the insulator due to internal sputtering of the gauge. The metal may be a metal washer mounted to the top portion of the insulator.

In embodiments of the CCIG, the cathode electrode can include a base plate and a cylindrical side wall extending from the base plate. The base plate can surround and be coupled to the feedthrough insulator.

A method of measuring pressure includes applying a magnetic field to a discharge space between an anode and a cathode; releasing electrons into the discharge space to create a plasma discharge in the discharge space and ion current flow to the cathode; with a shield mounted to the cathode, shielding a feedthrough insulator supporting the anode from electrons of the plasma discharge; and determining pressure based on measured ion current flow to the cathode.

More generally, a CCIG includes an extended anode and a cathode electrode surrounding the anode along a length of the anode. This cathode electrode (e.g., a cathode cage) forms a discharge space around the anode to enable formation of a pure electron plasma between the anode and the cathode and a resultant ion current flow into the cathode. A magnet is provided that is configured to apply an axial magnetic field perpendicular to the radial electric field through the discharge space to lengthen free electron paths to sustain the plasma. The gauge further includes a feedthrough insulator supporting the anode. The cathode includes an anode shield that defines a shield aperture above the insulator. The anode extends through the shield aperture, the aperture dimensioned such that there is an electric field from an anode potential at the metal on the insulator directly to the cathode at a cathode potential with no axial component of that electric field above the metal and shield aperture to draw electrons into the metal from the plasma. Further, an electric controller is provided that applies voltage between the anode and the cathode to create ionization with plasma discharge between the anode and the cathode, the controller determining pressure based on measured ion current flow to the cathode.

The cathode can be spaced from the anode by a first spacing provided at the shield aperture, the cathode being spaced from the insulator at the shield aperture by a second spacing greater than the first spacing.

The cathode can include a side wall and may also include a base plate, in which case the side wall can extend from the base plate. Typically, the side wall is cylindrical and surrounds the anode, which can be a cylindrical post. The shield aperture can be formed or otherwise provided in the base plate of the cathode.

The cathode can include a base plate and a shield plate mounted to the base plate over a base plate aperture, in which case the shield aperture can be in the shield plate. Alternatively, the shield aperture can be formed or otherwise provided in a shield plate that is suspended across an opening at the base of the cathode. For example, if the cathode includes a base plate, the shield plate can be suspended across a base plate aperture in the base plate.

In embodiments that include a cathode electrode defining a shield aperture, the shield aperture can be circular, and the first spacing, between the cathode and the anode, can be determined by the radius of the shield aperture. The first spacing can be within a range of 0.9 to 2.7 millimeters (about 0.035 to 0.105 inches). The second spacing, between the cathode and the insulator, can be within a range of 0.9 to 2.7 millimeters (about 0.035 to 0.105 inches).

A method of measuring pressure includes applying a radial magnetic field to a discharge space between an anode and a cathode; releasing electrons into the discharge space to create a plasma discharge in the discharge space and ion current flow to the cathode; with the cathode, establishing an electric field from an anode potential at metal on a feedthrough insulator supporting the anode directly to the cathode at a cathode potential with no axial component of that electric field above the metal and cathode to draw electrons into the metal from the plasma discharge; and determining pressure based on measured ion current flow to the cathode.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3A illustrates an example anode and ceramic feedthrough insulator configuration.

FIG. 3B illustrates an example anode and feedthrough insulator including a metal disk.

FIG. 4A illustrates an example ceramic feedthrough insulator supporting an anode of a gauge and an electron sheath at the anode during operation of the gauge.

FIG. 4B illustrates build-up of metal on the feedthrough insulator and anode of FIG. 4A as a result of internal sputtering within the gauge.

FIG. 4C is a detail view of the feedthrough insulator of FIG. 4B.

FIG. 22 shows example results in a gauge without a shield. FIG. 23 illustrates pinching of equipotential lines due to presence of a shield.

DETAILED DESCRIPTION

A description of example embodiments of the invention follows.

An anode electrode shield, for an inverted magnetron cold cathode ionization gauge (CCIG), which preserves the free electron plasma density vs. pressure, is described that when used in conjunction with a standard electrical feedthrough design improves the sensitivity of the gauge response to gas, the linearity of the gauge response to gas, and provides immunity to discharge sustaining issues. The anode electrode shield also improves gauge lifetime, minimizing sensitivity drift and also consistently provides a more reproducible gauge response unit-to-unit. With the new shield in place, we expect any inverted magnetron CCIG will exhibit enhanced sensitivity and longer lifetime. An electrode shield according to embodiments of the invention can be used with (e.g., retrofitted into) existing CCIG products.

Advantageously, embodiments as described herein can have the following useful features:
a) Provide a pressure independent pure electron plasma density.
b) Increase the sensitivity of an inverted magnetron CCIG to gas pressure.
c) Improve the linearity of the gauge response to pressure, i.e. making sure the linearity coefficient is as close to 1 as possible.
d) Decrease the chances of the gauge experiencing discharge sustaining issues at low pressures, effectively displacing the magnetron knee to lower pressures.
e) Increase gauge lifetime by minimizing the amount of drift in the gauge over time and as a function of pressure dose.
f) Provide improved unit-to-unit reproducibility leading to the ability to develop nominal calibration curves for a product fitted with the new shield design.

Traditional Inverted Magnetron CCIGs have relied on many different anode feedthrough designs. However, in general, little attention has been paid to the transition from the anode post to the feedthrough insulator. Applicants have discovered that unless a shield is installed around the transition area with the characteristics described in this disclosure, loss of accuracy and sensitivity can occur in the gauge, and discharge sustain issues can occur at low pressures below 1E-7 Torr.

Figures 1A, 1B:
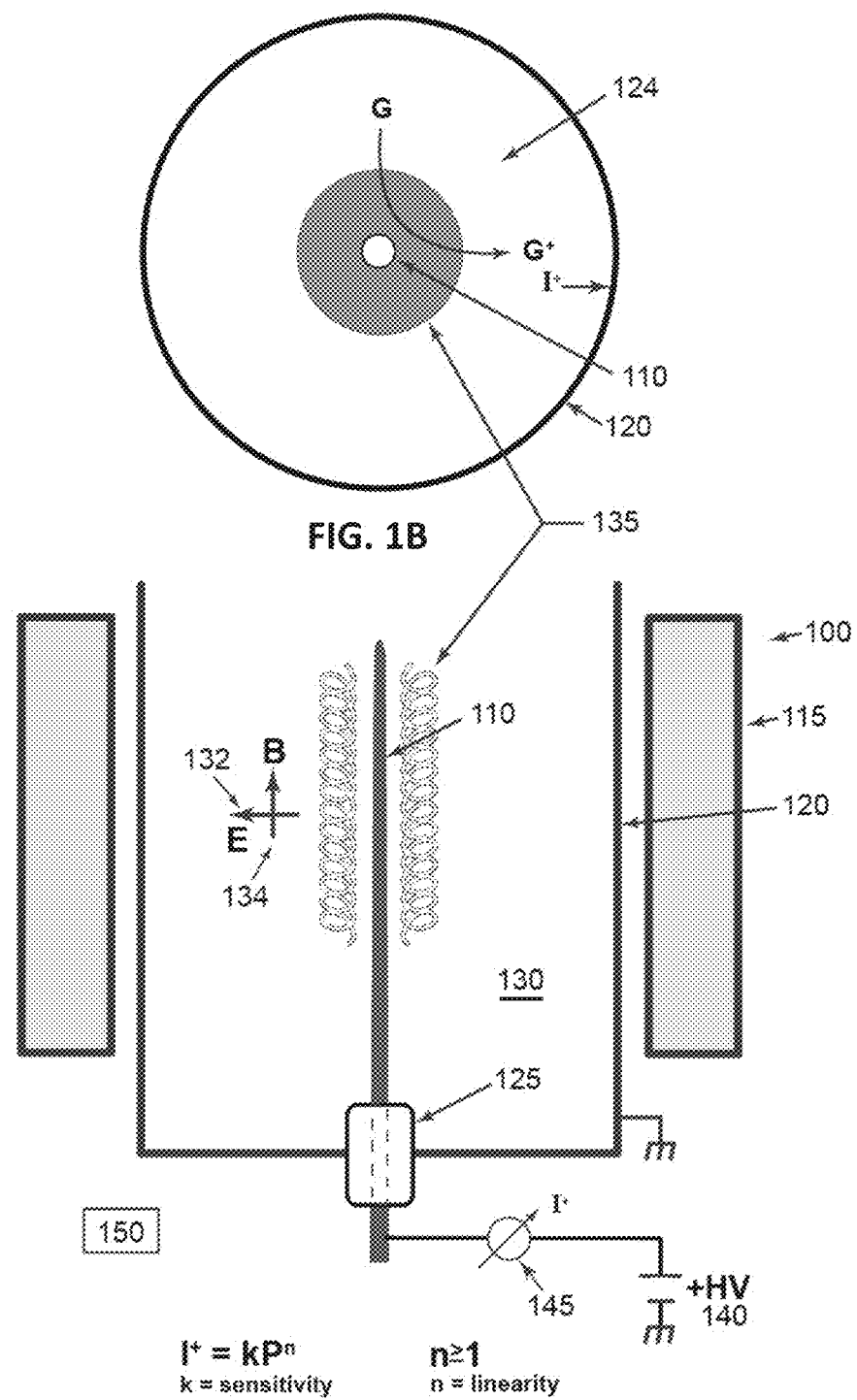
FIG. 1A is a diagram illustrating an inverted magnetron Cold Cathode Ionization Gauge (CCIG).
FIG. 1B is diagram illustrating a top view of the cathode and anode of the gauge of FIG. 1A.

FIGS. 1A and 1B illustrate the principle of operation of a CCIG of the inverted magnetron design. CCIG 100 includes an extended anode 110, a cathode 120 surrounding the anode along a length of the anode, and a feedthrough insulator 125 supporting the anode. The cathode forms a discharge space 130 around the anode to enable formation of a pure electron plasma between the anode and the cathode and a resultant ion current flow into the cathode. The gauge 100 further includes a magnet 115 applying a magnetic field through the discharge space 130 to lengthen free electron paths to sustain the plasma. An electric controller 150 applies voltage between the anode 110 and the cathode 120 to create ionization with plasma discharge between the anode and the cathode, the controller determining pressure based on measured discharge current, e.g., ion current flow to the cathode. In the example shown, ion current flow is measured with a current sensor 145 at the anode; however, ion current flow can also be measured at the cathode. An example circuit configuration to measure ion current flow at the cathode is described in U.S. patent application Ser. No. 14/500,820, U.S. Publication No. 2015/0091579 to Brucker et al., now U.S. Pat. No. 9,671,302, incorporated herein by reference in its entirety.

When the high voltage (HV) 140 is turned on, a pure electron plasma is established and a sheath of electrons 135 develops around the anode 110. The electrons in the sheath move in spiral motion up and down the anode post 110 under the influence of crossed magnetic 134 and electric 132 fields (E×B field), as schematically shown in FIG. 1A. Under the influence of the crossed magnetic and electric fields, the electron cloud builds up to a fixed and pressure-independent electron density. If the conditions are carefully chosen and controlled, the electron density is independent of pressure, and the ion current signal ($I^+$) generated is directly proportional (n=1) to gas pressure (P). The ion current signal, or discharge current, can be expressed as: $I^+=kP^n$, where k is sensitivity and n is linearity of the gauge. In most cases though, there is some dependence of the electron density on pressure so that n>1 in most cases. Industry standard values for n span from 1 to 1.2 for most gauges in the market that can report 1E-8 Torr pressure readings.

Under the crossed fields (132, 134), the electrons accumulated around the anode 110 drift slowly towards the anode as the attraction of the electric field is counteracted by the precession induced by the magnetic field. Electrons are lost slowly to the anode through a migration process that requires loss of energy due to collisions with gas molecules (G) as illustrated at 124 in FIG. 1B. The slow migration of electrons to the anode, compared to the fast movement of the ions ($G^+$) formed in the sheath 135 to the cathode (only affected by the electric field and too heavy to be affected by magnetics), is what causes the plasma to accumulate negative charge around the anode and as needed to produce ionization of gas molecules. Under the ideal conditions illustrated in FIGS. 1A and 1B, electrons are only lost from the sheath 135 as a result of inelastic collisions with neutrals, some of which result in ionization.

Figure 2:
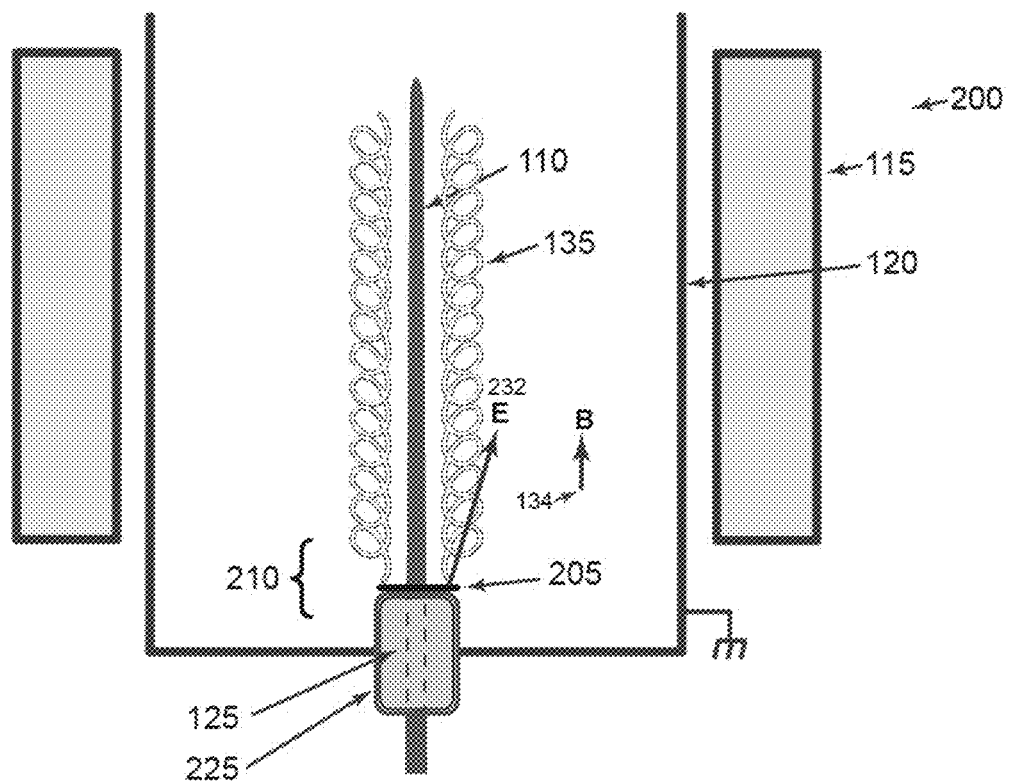
FIG. 2 illustrates electron loss in a CCIG having a metal plate or metal coating at a feedthrough insulator.

One problem with the design illustrated in FIG. 1A is that unless care is taken to avoid loss of electrons at the bottom of the anode post at the feedthrough 125, the electron sheath 135 can be affected by a loss mechanism as illustrated in FIG. 2 and described next.

FIG. 2 is a diagram illustrating a CCIG 200 where electron loss can occur. The gauge 200 is similar to gauge 100 of FIG. 1A in that it includes anode 110, cathode 120 and a magnet 115. The feedthrough 125 that provides electrical connection for the anode 110 across the base of the gauge 200 has a metal coating or metallic element (washer or cup) 205 on the transition area 210 from the anode post 110 to the ceramic insulator (vacuum side) 225 that is exposed to the electron discharge 135. In this case, right at the transition region, the electric field is no longer perpendicular to the magnetic field 134 and electrons can be lost at that end to the anode plate or coating 205. The reason the electrons are lost is because at the transition area 210 the electric E and magnetic B fields are no longer perpendicular as required to keep the electrons in precessing trajectories and away from the anode surface. The electric field is thus able to draw electrons from the electron sheath 135 into the metal 205 at anode potential.

As mentioned above, a properly designed CCIG, with perpendicular magnetic and electric fields, contains a pure electron plasma discharge, i.e. a pressure-independent cylindrical electron sheath located around the anode post. The ion current generated by electron ionization of neutral gas molecules is then linearly related to pressure with a linearity coefficient: n~1.1. The pressure-independent electron sheath is the result of a dynamic balance between: (1) the rate of electron formation (secondary electron emission at cathode and electron ionization at sheath) and (2) electron loss rate at anode (migration to anode post and ion-electron recombination). If electron loss rate to the anode is increased, it is possible to experience a phenomenon known as discharge sustaining failure by which the electron density drops as the pressure drops. If the electron discharge density drops with pressure, the linearity coefficient n increases (i.e. n>1.2), leading to what is known as non-linear response and appearance of a magnetron knee, i.e. an inflection point in the ion current vs. pressure curve. Gauges operated at pressures below the magnetron knee lose ion current signal rapidly with pressure and eventually fail to sustain a discharge below pressures above their minimum reportable pressure (MRP) specification. It is critical to design CCIGs to exhibit magnetron knees and/or discharge sustain thresholds well below their MRP.

Notice that in FIG. 2 the metallic component 205, providing an electric field component 232 substantially parallel to the magnetic field 134, can be a metallic ring or cup located at the end of the ceramic insulator 225 of anode feedthrough 125. The insulator 225 can have a flat top extending along the radius of the gauge 200. The insulator 225 can also be a pure ceramic feedthrough insulator that became coated by the internally sputtered metallic material inside the gauge. Regardless of the source of metal, if a conductive surface, which is electrically connected to the anode, develops perpendicular to the axial anode 110, that surface will act as a loss surface for electrons and will reduce the sensitivity of the ion current to pressure.

The loss of electrons caused by the metallic surface on the transition area of the feedthrough reduces the electron density around the anode and diminishes the sensitivity of the gauge to pressure. In other words, a brand new gauge with an uncoated ceramic top will lose electron density as the ceramic is coated with metal. This is a phenomenon that has been observed in gauges with epoxy bonded feedthroughs that start with a purely dielectric transition zone that progressively becomes conductive as internal sputtering coats the surfaces of the insulator with a metallic layer.

Where a purely ceramic transition is fitted with a metal component, the sensitivity of the gauge drops and the linearity of the device drops (with n exceeding 1.2 at the lowest pressures).

FIGS. 3A and 3B illustrate the difference between a feedthrough configuration having a ceramic insulator 325 and a feedthrough configuration having a metal disc 305 brazed to the ceramic insulator 325. In FIG. 3A, the ceramic feedthrough insulator 325 is mounted to anode post 110 using epoxy 330, to support the anode 110 and provide a seal. In this configuration, electron loss from the plasma sheath 135 does not occur, or is negligible, provided the ceramic insulator 325 is spared from being coated with internally sputtered metal during operation of the gauge. In the configuration shown in FIG. 3B, electrons are lost from the electron sheath 135 to the metal disc 305, which is at an anode potential. The difference in electron loss between the configurations results in a difference in gauge sensitivity, the gauge sensitivity in FIG. 3A being higher than that of FIG. 3B, and difference in gauge linearity (n). For example, gauge linearity (n) can be about 1.1 in FIG. 3A and about 1.3 in FIG. 3B.

FIGS. 4A and 4B illustrate what can occur as a purely ceramic insulator becomes coated with internally sputtered metal leading to a loss of electron density in the sheath. FIG. 4A illustrates an example ceramic feedthrough insulator 425 supporting anode 110 of a gauge and an electron sheath 135 at the anode 110 during initial operation of the gauge. As described with reference to FIG. 1A above, electrons move up and down the anode 110 in a spiral pattern, held in position by a magnetic field. Over time, the feedthrough insulator 425, as well as the anode 110, become partially or fully coated with internally sputtered metal 405, as illustrated in FIG. 4B. As illustrated in the detail view of FIG. 4C, a portion of the feedthrough insulator 425 may not have any coating. The coating at anode potential results in an electric field near the coating that is parallel to the magnetic field. The electron density in sheath 135 is lost as the coating 405 develops. This is a reason why gauges that initially are able to operate to very low pressures suddenly start to lose sensitivity at the low end of the pressure range.

Applicants have realized that whether a brazed or epoxied ceramic feedthrough assembly is used in a gauge, there is a need to prevent electron density from being lost to the transition area either due to metallic design or the buildup of metallic material later on. This disclosure presents a simple yet very effective way to provide immunity to the loss of electrons due to losses at the transition based on the addition of a shield at the transition area.

The following sections describe the principles for the design of an anode shield to diminish and even prevent electron loss at the transition area from anode to feedthrough insulator.

Figure 5A:
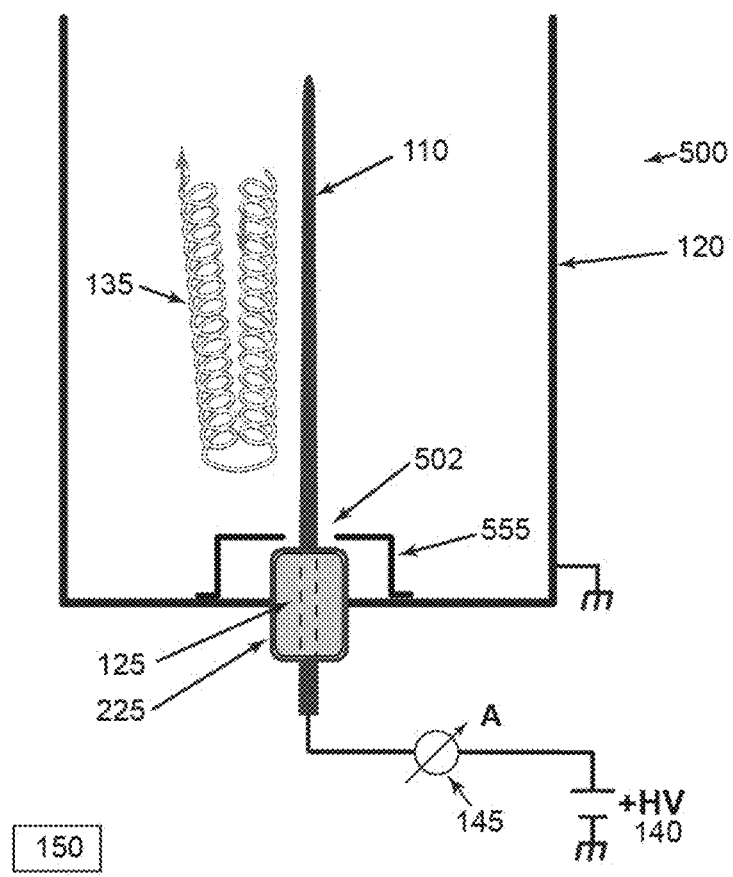
FIG. 5A is a schematic diagram of a CCIG that includes an anode electrode shield according to an embodiment of the invention.

FIG. 5A is a diagram illustrating an example of a gauge 500 having an anode electrode shield 555 according to an embodiment of the present invention. The gauge is similar to gauge 100 of FIG. 1A in that it includes a central anode post 110 supported by a feedthrough 125 and surrounded by a cathode 120. The anode 110 is connected to a high voltage potential 140 via sensor 145, the latter two controlled by controller 150. For simplicity, the magnet 115 (FIG. 1A) has been omitted from FIG. 5A. The gauge 500 differs from that of FIG. 1A in that the gauge includes the shield 555 positioned above the ceramic insulator 225 of feedthrough 125. The shield includes an aperture 502 through which the anode 110 extends.

With the anode shield 555 in place, and electrically connected to ground through the cathode 120, the electron sheath 135 is kept away from the transition area at feedthrough insulator 225 as the bias potential appears negative relative to the potential of the sheath 135 around the anode 110. This creates a repulsive potential that pushes the electrons away from the transition zone as the electrons reach that area. Without loss of electrons in that region, the electron sheath 135 builds up and the sensitivity of the gauge increases even exceeding that of a gauge with a pure ceramic feedthrough.

The shield can have different configurations and design options, including cup designs and more open designs made out of sheet metal. Example shield configurations are shown in FIGS. 6A-6D.

Figure 6A:
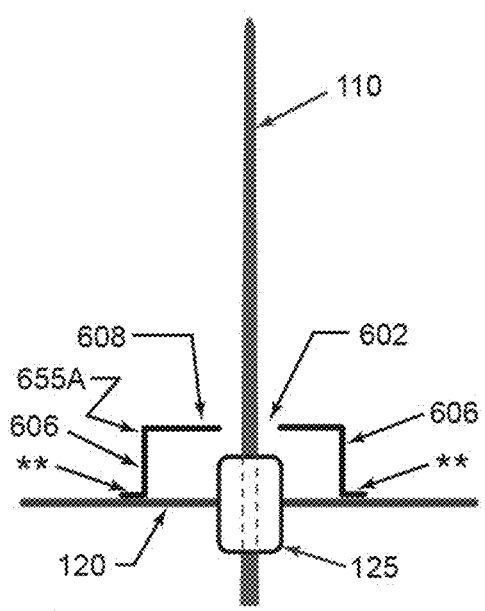
FIGS. 6A-6D illustrate example shield configurations that can be employed in embodiments of the invention.

FIG. 6A illustrates a shield 655A mounted to cathode 120 at mounting points (indicated by "**" in the figure) and spaced from anode 110. A feedthrough insulator 125, interposed between the anode and the cathode, supports the anode 110. The shield 655A includes a cup having side wall 606 and plate 608 in which an aperture 602 is formed. The anode 110 extends through the aperture 602.

Figure 6B:
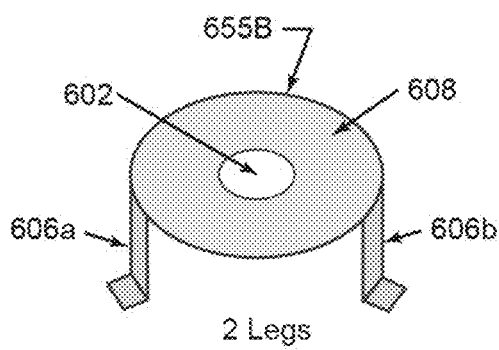
Figure 6C:
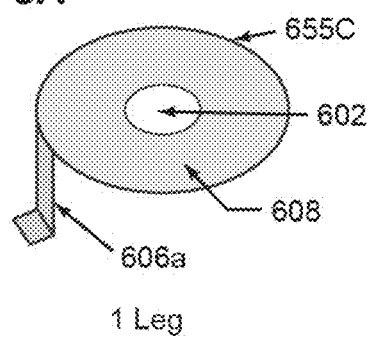
Figure 6D:
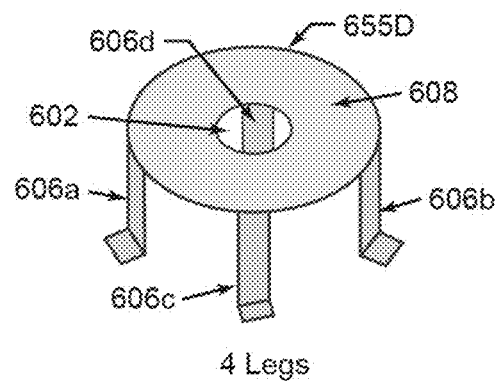

In alternative embodiments shown in FIGS. 6B-6D, shield 655C includes one leg 606a, shield 655B includes two legs 606a and 606b, and shield 655D includes four legs 606a, 606b, 606c and 606d. The legs act as spacers to provide appropriate spacing of aperture 602 in plate 608 above feedthrough insulator 125 (FIG. 6A). As illustrated, the aperture 602 can be circular. A radius of the aperture 602 can determine the spacing of the shield from the anode.

This disclosure is focused on the concept of a shield that is capable of preventing electrons from being lost to the transition zone, e.g., the transition area from the anode to the feedthrough insulator on the vacuum side of the gauge (see, e.g., transition area shown in FIG. 2). The exact design can vary from product implementation to product implementation, but as long as a shield is used to purposely fold the electrons' trajectories back into the anode region before they are lost in the transition region of the feedthrough, the gauge sensitivity is maintained.

Returning to FIG. 5A, the diagram illustrates the way in which the shield 555 operates, redirecting the electrons back into the anode central region after being reflected by the shield. The electrons in the sheath 135 are free to move up and down but are reflected back axially at both ends by a baffle plate on top (not shown in FIG. 5A, but see, for example, baffle 924 in FIG. 9) and shield 555 at the bottom. The space between the shield 555 and any metal on the insulator 225 must be sufficiently large, and the space between the shield 555 and the anode 110 at aperture 502 must be sufficiently small to assure field lines in the region of the electron sheath 135 repulse electrons back into the sheath and not draw them into the metal on the insulator.

As an additional advantage of the shield, it can also protect the anode feedthrough and its insulator from the internally sputtered material that can coat the insulator with a conductive layer otherwise. In other words, the shield does not only provide a way to avoid losing electrons in the transition area, but also prevents the buildup of line-of-sight conductive coatings on the insulator.

An important aspect of the disclosed improvement to CCIGs is that the improvement (e.g., the shield) can be retrofitted into many different commercially available products to provide the same advantages: improved sensitivity and linearity and longer lifetime.

With the shield in place, it is possible to add starter capabilities to the assembly. For example, one can design a star pattern on the top hole of the shield that can aide starts with field emission capabilities.

Figure 5B:
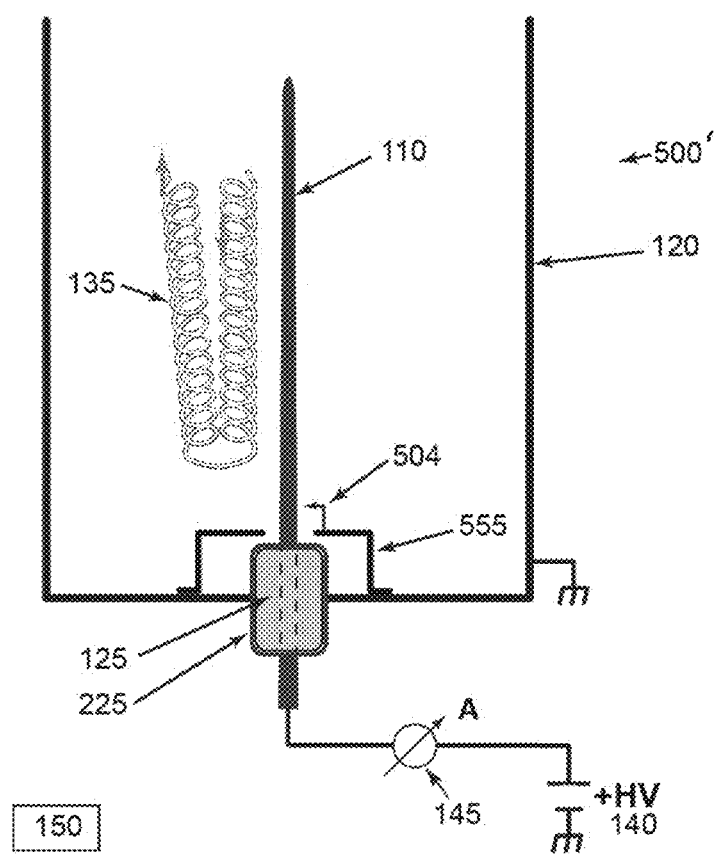
FIG. 5B illustrates the gauge of FIG. 5A modified to include a field emitter as a starter device.

FIG. 5B illustrates an example embodiment of a gauge 500' having an electrode shield 555 to which a starter device is added. As shown in the figure, a field emitter 504 is provided at the electrode shield 555 as the starter device. Suitable field emitter configurations are described, for example, in prior application U.S. patent application Ser. No. 14/500,820, published as U.S. Publication No. 2015/0091579 to Brucker et al., now U.S. Pat. No. 9,671,302, and incorporated herein by reference. In the gauge described in the prior application, the starter was added to a guard ring electrode that was used to separate leakage and field emission current from true ion current.

There are several known gauges that include a cylindrical sheath around the transition area; however, leaving the metallic washer or cup exposed in the transition area leads to loss of electrons. The shield approach disclosed here can be used to retrofit those earlier gauges to provide better performance.

Figure 7A:
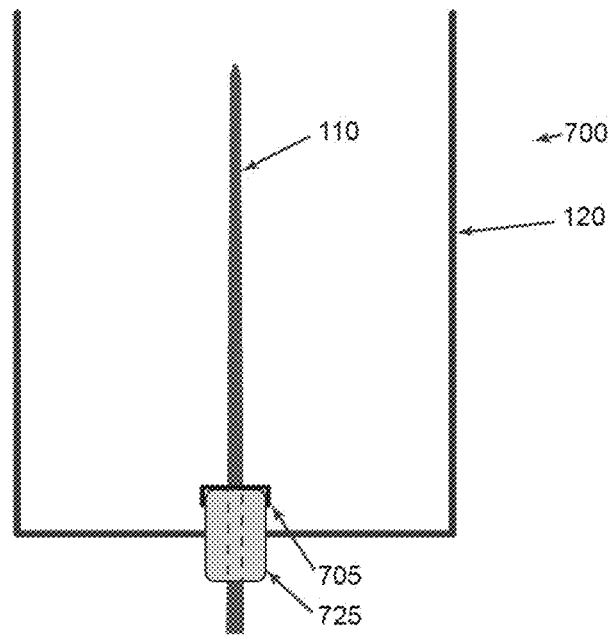
FIG. 7A is a schematic diagram of a prior CCIG device.

FIG. 7A is a schematic diagram of a prior CCIG device. A gauge 700 includes anode 110 and cathode 120 surrounding the anode. A ceramic feedthrough 725 supports the anode and includes a metal cup or disk 705.

Figure 7B:
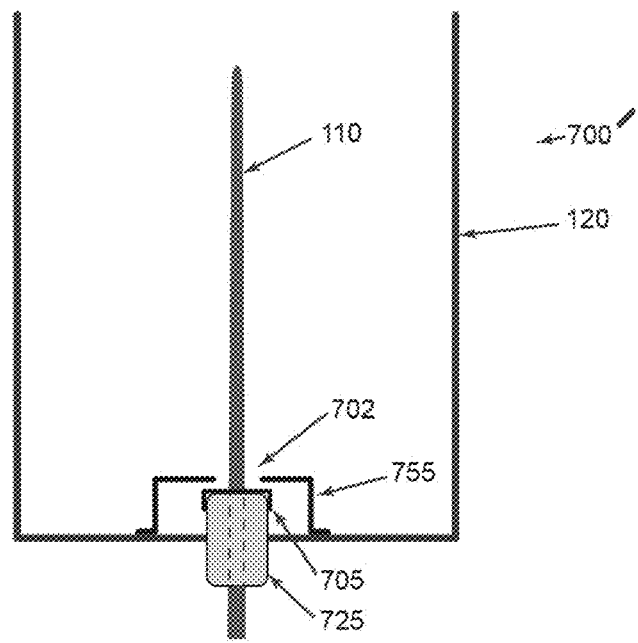
FIG. 7B illustrates the CCIG device of FIG. 7A retrofitted with a shield according to an embodiment of the invention.

FIG. 7B illustrates the CCIG device of FIG. 7A retrofitted with a shield according to an embodiment of the invention. Gauge 700' includes shield 755 positioned over the metal disk 705 of feedthrough 725. Anode 110 of the gauge 700' extends through an aperture 702 in the shield 755. The shield is connected to cathode 120.

Figure 8A:
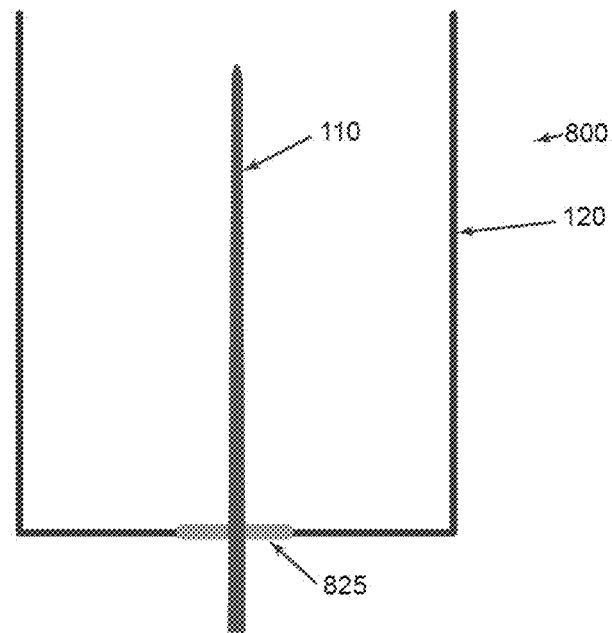
FIG. 8A is a schematic diagram of another prior CCIG device.

FIG. 8A is a schematic diagram of another prior CCIG device. Gauge 800 includes a cathode 120 that surrounds an anode 110. An insulator ring 825 is positioned between the anode and the cathode.

Figure 8B:
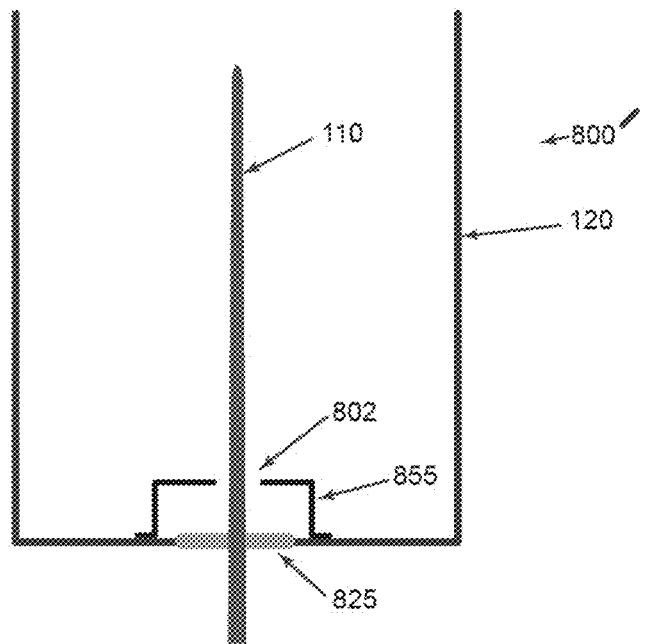
FIG. 8B illustrates the CCIG device of FIG. 8A retrofitted with a shield according to an embodiment of the invention.

FIG. 8B illustrates the CCIG device of FIG. 8A retrofitted with a shield 855 according to an embodiment of the invention. In gauge 800', the shield 855 is mounted to cathode 120 over insulator 825. The anode 110 extends through an aperture 802 in the shield.

Figure 9:
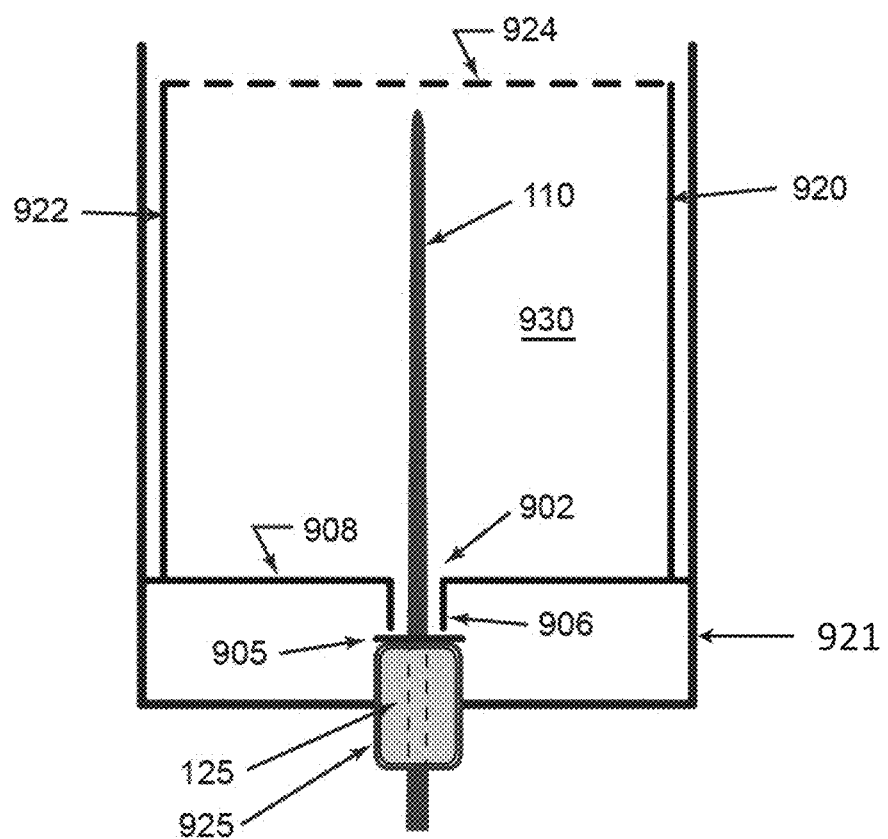
FIG. 9 illustrates an alternative approach to shielding a feedthrough insulator according to an embodiment of the invention.

An alternative design for the shield is to incorporate it into a bottom plate aperture 902 of a cathode, e.g., a cathode electrode, 920 as shown in FIG. 9. The cathode 920, which include a bottom plate 908 and a side wall 922 extending from the bottom plate, forms a discharge space 930 around the anode 110. The anode 110 is supported by feedthrough 125, which includes ceramic insulator 925 through which the anode extends. A cathode electrode envelope 921 surrounds the cathode 920. In this case, the electron sheath (not shown) is turned around by the ground plane at the bottom of the cathode 920. The space between the bottom plate 908 and any metal 905 on the insulator must be sufficiently large and the space between the bottom 908 and the anode 110 must be sufficiently small to assure field lines in the region of the electron sheath repulse electrons back into the sheath and not draw them into the metal on the insulator. As illustrated, a lip 906 can be provided at the bottom plate 908 to aid with proper spacing. Optionally, bottom plate 908 of the cathode electrode is perforated to allow venting. A baffle 924 is provided at the top of the cathode 920.

Figure 10A:
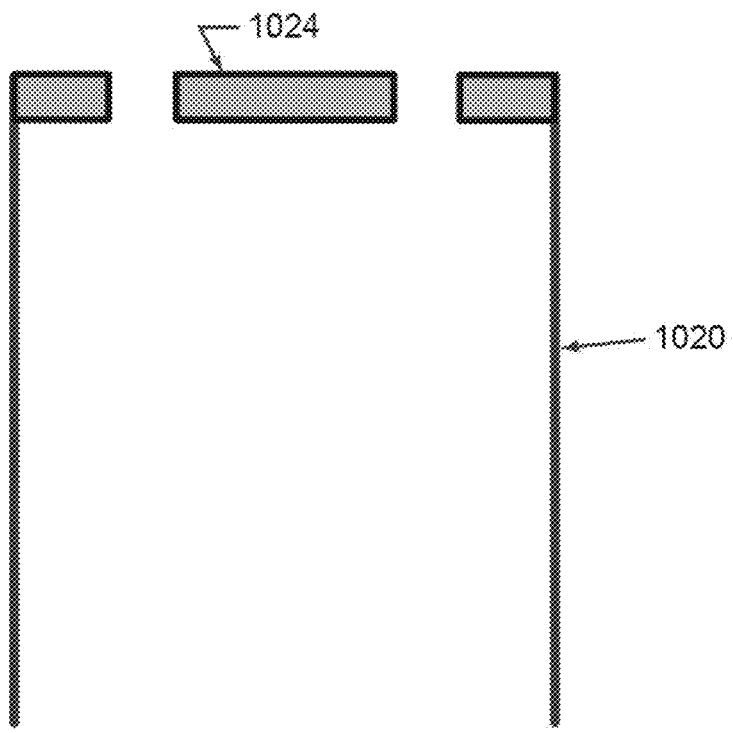
FIG. 10A illustrates a prior cathode electrode design.

FIG. 10A illustrates a prior cathode design. Cathode 1020 includes an opening at the bottom and a baffle 1024.

Figure 10B:
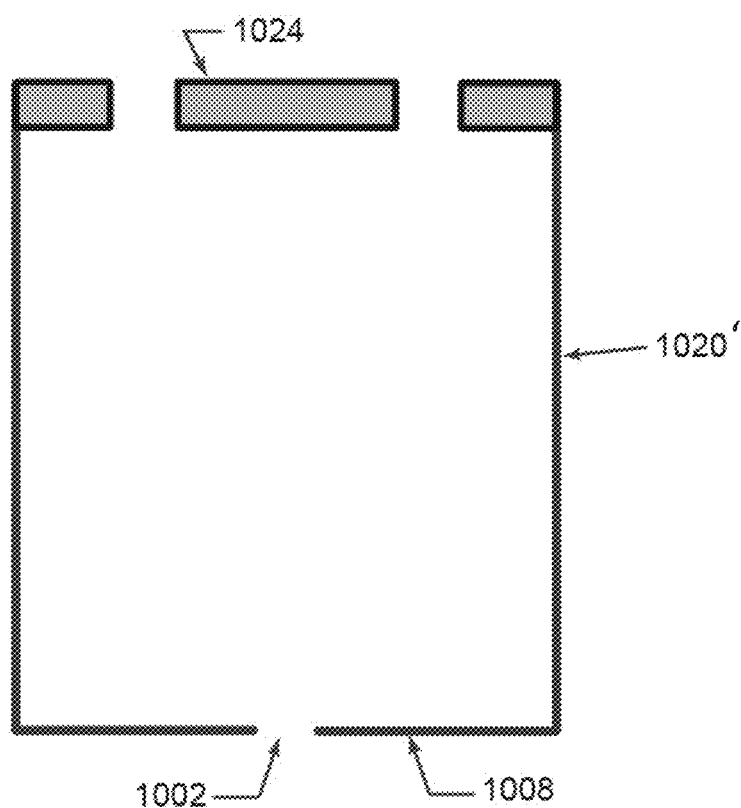
FIG. 10B illustrates a cathode that includes an aperture in a bottom plate according to an example embodiment of the invention.

FIG. 10B illustrates a cathode 1020' that includes an aperture (e.g., small opening) 1002 in a bottom plate 1008 according to an example embodiment of the invention.

Figure 11:
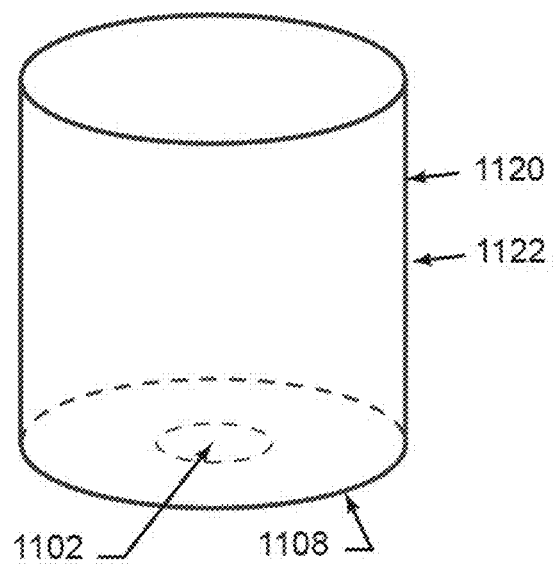
FIG. 11 illustrates a cathode having a side wall and a centrally located aperture in a bottom plate according to another example embodiment of the invention.

FIG. 11 illustrates a cathode 1120 having a side wall 1122 and a centrally located aperture 1102 in a bottom plate 1108 according to another example embodiment of the invention.

Making the shield become part of the cathode is also a good way to make sure the shield is also replaced whenever the cathode is replaced. Adding a plate at the bottom of the cathode is useful to protect the entire feedthrough assembly from contamination. This can also effectively add baffling for other type of sensors, such as Pirani and PRD (piezoresistive diaphragm) sensors, that are included in the envelope for certain gauges.

In an alternative implementation, the small opening could also be supported by radially positioned arms at the bottom of the cathode, effectively a floating plate (e.g., disk) with a small opening above the feedthrough pin. This would provide higher gas conductance to the bottom of the gauge if outgassing conductance is an issue.

Figure 12A:
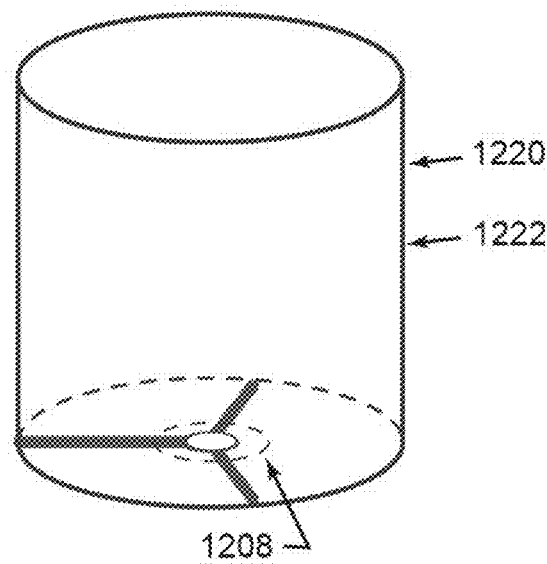
FIG. 12A illustrates a cathode including a floating disk shield according to another example embodiment.

FIG. 12A illustrates a cathode 1220 having a side wall 1222 and including a floating disk 1208 shield according to another example embodiment.

Figure 12B:
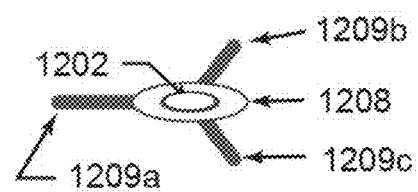
FIG. 12B illustrates the floating disk of the cathode of FIG. 12A.

FIG. 12B illustrates the floating disk 1208 and arms of the cathode of FIG. 12A. The disk 1208 includes aperture 1202 is suspended by arms 1209a, 1209b, 1209c across the opening at the bottom of the cathode 1220.

A prior gauge utilized a cathode having a base plate in combination with a double inverted magnetron configuration, but the primary purpose of the cathode was to provide shielding from self-sputtered material. The high magnetic field strength in that gauge made it unnecessary to shield the top of the feedthrough insulator. A cap over the feedthrough insulator coupled to a guard ring provided a starter for fast UHV (ultrahigh vacuum) pressure starts.

Embodiments of the invention are particularly useful for low cost systems that have low magnetic fields. The shield eliminates problems of electron loss resulting from the low magnetic fields with very low economic impact on cost.

Embodiments of the invention can be employed (e.g., installed, retro-fitted) in existing products to provide one or more of the following advantages and benefits:
 a) Increased sensitivity within the same package;
 b) Minimal cost increase;
 c) Longer lifetime;
 d) Decreased incidence of discharge sustaining issues at the lowest pressures;
 e) Improved linearity;
 f) Easier and faster calibration;
 g) Development of a nominal calibration curve so that only verification is required;
 h) No additional changes required to the design of the gauge; simple retrofit the shield by addition;

In the case of certain gauges that include a second plate mounted on top of the feedthrough's mounting plate, a shield in accordance with embodiments of the present invention can be added to the second plate and mounted on top of the feedthrough's mounting plate. The second plate often is a titanium plate, but may be replaced with a stainless steel plate of polished finish which works just as well.

The shield described herein can be made out of electro-polished stainless steel, such as stainless steel 304 or 316 material. Other suitable materials include aluminum and titanium.

Figure 13:
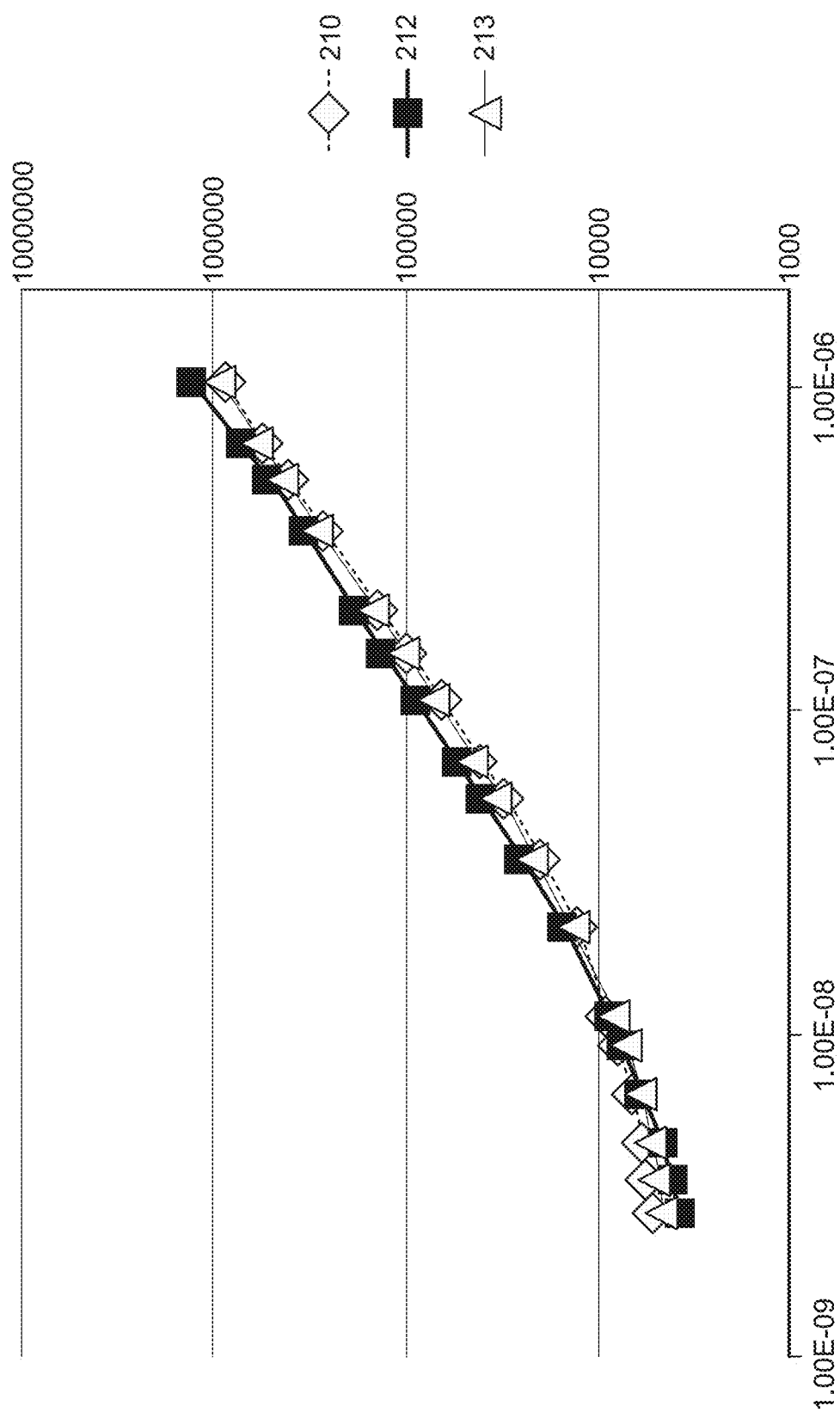
FIG. 13 is a graph illustrating example results of measurements of ion current as a function of pressure for three prototype gauges that include anode electrode shields.

The operational advantages of the design improvement have been verified in the laboratory with three gauge units demonstrating very consistent performance. FIG. 13 is a graph of corrected digital counts, indicative of ion current, as a function of pressure (Torr) for three gauges (labeled "210", "212" and "213"). The figure shows a very consistent performance in the three samples and a linear response into the low 1E-8 Torr range. Gauges also outgas (mostly water) very fast and, e.g., within one hour, if an all-metal and ceramic feedthrough is selected.

The slight upward deviation in linearity at low pressure (<1E-8 Torr), which can be observed in FIG. 13, is due to internal water outgassing, suggesting that the gauge is outgassing internally about 6.5E-9 Torr of water (curve fit).

Figure 14:
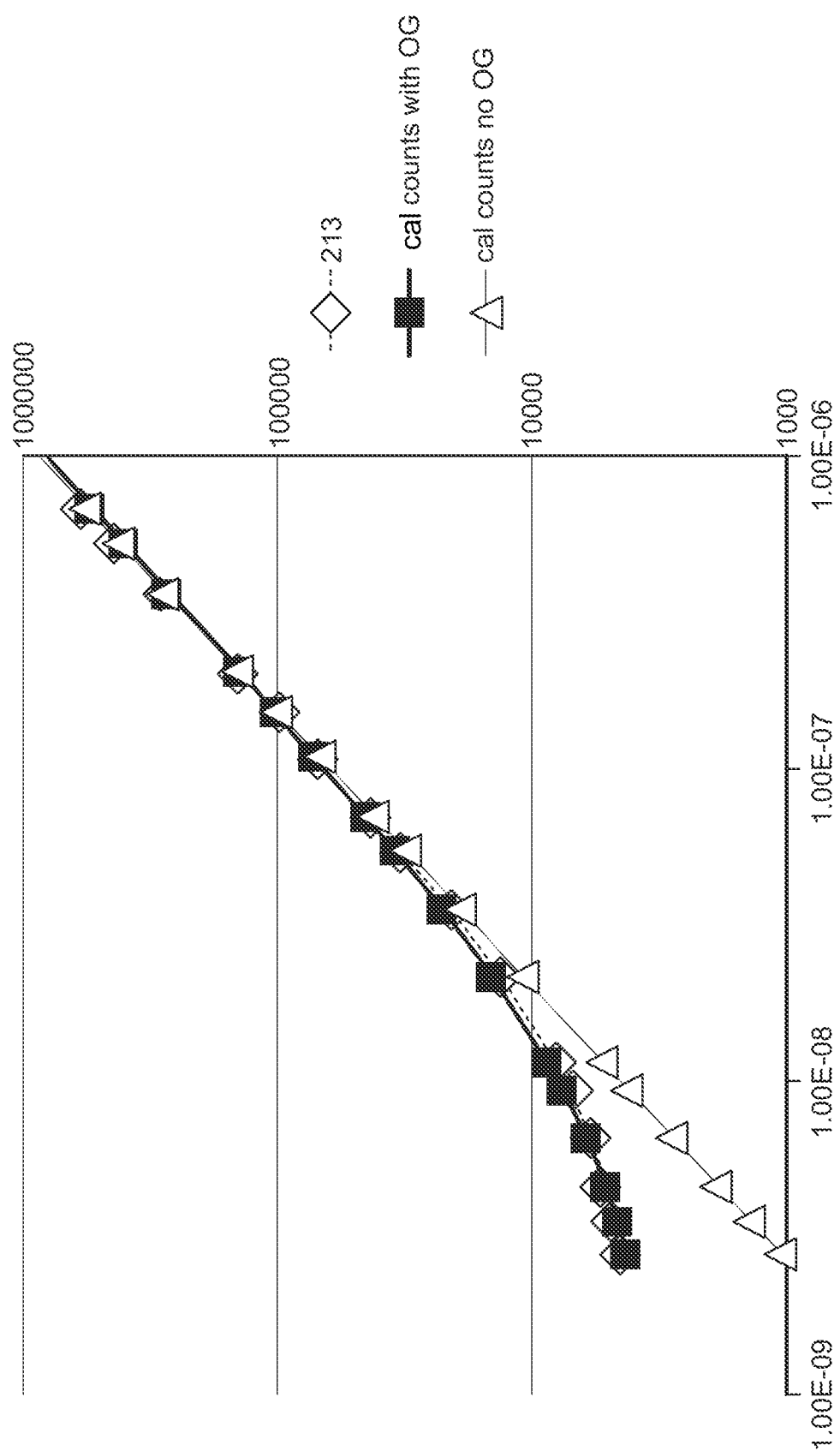
FIG. 14 is a graph illustrating the contribution of internal water outgassing to internal pressure readings.

FIG. 14 is a graph showing the contribution from internal water outgassing (OG) to the internal pressure readings. In two of the units (labeled "213" and "cal counts with OG"), outgassing is observed. An upward deviation was not observed in the third unit (labeled "cal counts no OG") over the ranges of pressures tested. The fit shows that water outgassing is roughly 6.5E-9 Torr after one hour of drying.

Figure 15:
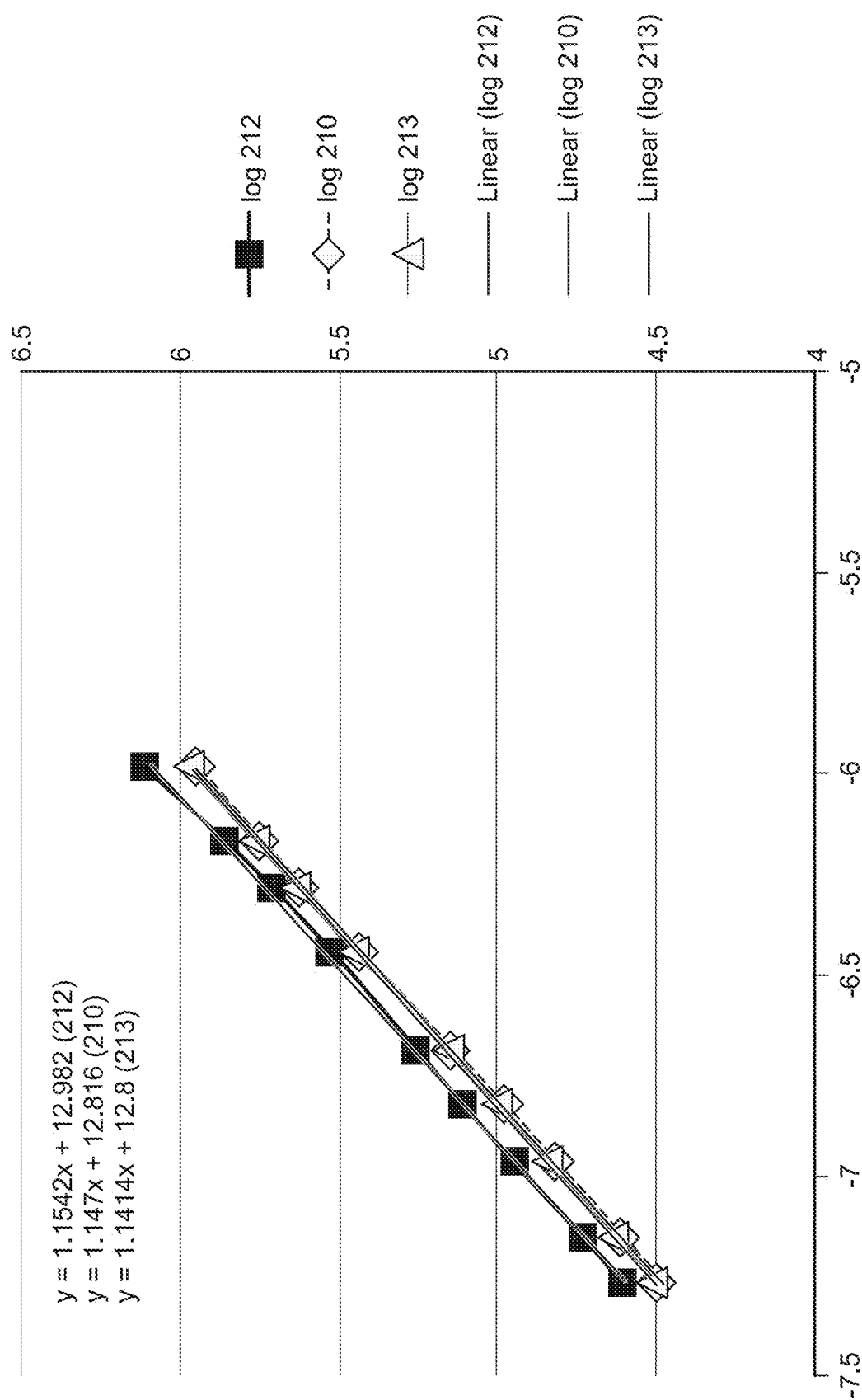
FIG. 15 is a graph illustrating example data from three gauges outfitted with shields and linear fits through the data.

One clear advantage gained from this design is the fact that the gauges are not only more linear (n=1.14 with shield vs>1.3 without shield), but also more reproducible unit-to-unit. The graph in FIG. 15 shows curves of counts as a function of pressure plotted on a log-log scale and linear fits to data for the three units (labeled "log 212" "log 210" and "log 213") between 1E-7 and 1E-6 Torr. The slopes of the fitted lines are: 1.154, 1.147 and 1.141.

The above results indicate that the apparently simple modification can not only increase the number of counts but also provide a more consistent gauge-to-gauge response.

Figure 16:
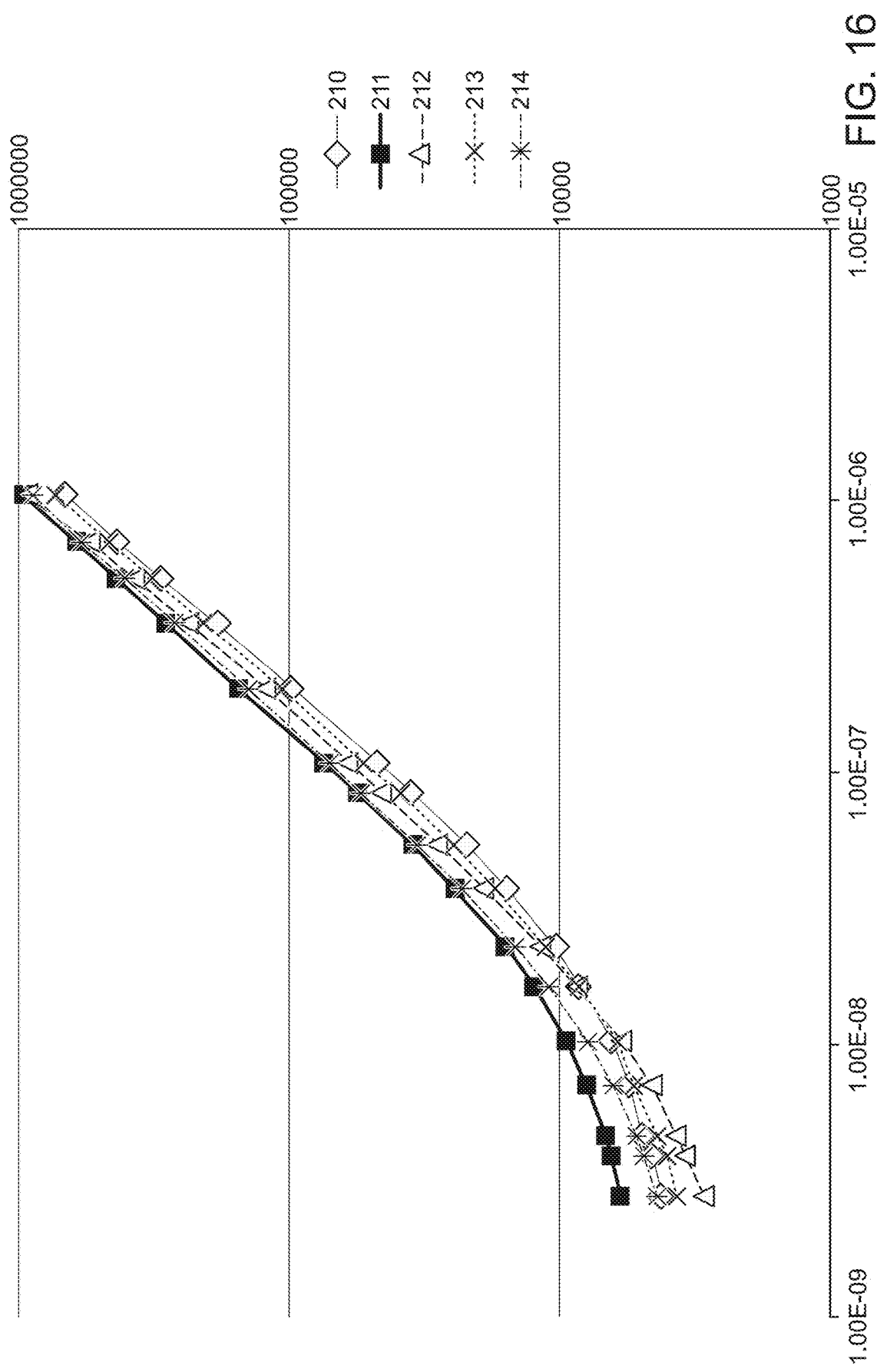
FIG. 16 is a graph illustrating example data from five gauges outfitted with an anode electrode shield.

FIG. 16 is a graph showing data for five individual gauges fitted with an anode electrode shield. The data show that the five gauges (labeled "210" through "214") have a tight distribution of sensitivity curves, which offer the possibility to develop a nominal calibration curve common to all gauges. The graph shows corrected counts (proportional to ion current) vs. pressure (Torr) for five gauge units that were dried enough to show water levels around 5E-9 Torr. The curves are all very similar, and it is clear that a nominal calibration curve may suffice with this new design with no need for specific calibration (i.e., verification only) or only a simple one or two point calibration to adjust the intercept in the log-log space of the calibration procedure. This can provide a dramatic improvement in production cycle times for certain gauge products. The slopes (n values) for the five units are all very close to each other, namely:

| 1.16 | 1.12 | 1.17 | 1.15 | 1.11 |

These data also suggest also a very tight unit-to-unit reproducibility with a low n value, which can provide a more robust gauge product.

It is also clear due to the linearity of the signal into the 1E-8 Torr range that gauges equipped with the shield no longer exhibit a magnetron knee below 1E-6 Torr. This allows extrapolation of the data between 1E-6 and 1E-7 Torr into the E-8 Torr range with no longer a need to calibrate in the 1E-8 Torr range. In certain applications, there may not even be a need to perform accuracy verification provided that the gauges perform well down to 1E-7 Torr. This, in turn, can save calibration time and improve production cycle times (all of which can result in cost reduction).

Embodiments are useful to increase the ion current at 1E-8 Torr in a CCIG product, so that the product does not experience discharge sustain issues, thereby enabling consistent and accurate performance at the 1E-8 Torr range. This is a particular advantage when using the gauge at the low end of the pressure range.

The shield can be implemented in standard gauge designs and can be used to improve the yield for a standard gauge product. Using the shield approach disclosed here, it is possible to manufacture gauges that provide a high signal (ion current measured as counts) at a 1E-8 Torr range and that do not run into discharge sustaining issues as soon as they leave the manufacturing facility or are baked out once. Whereas the present number of counts for certain legacy products is roughly 1000 counts at 1E-8 Torr, it is expected that this number rises to 8000 counts (nominal) for a retrofit design including a shield as disclosed herein. Further, the sensitivity is expected to increase about 4× over the entire pressure range, and linearity is expected to increase from a nominal 1.3 to 1.1 linearity coefficient (n).

Figure 17:
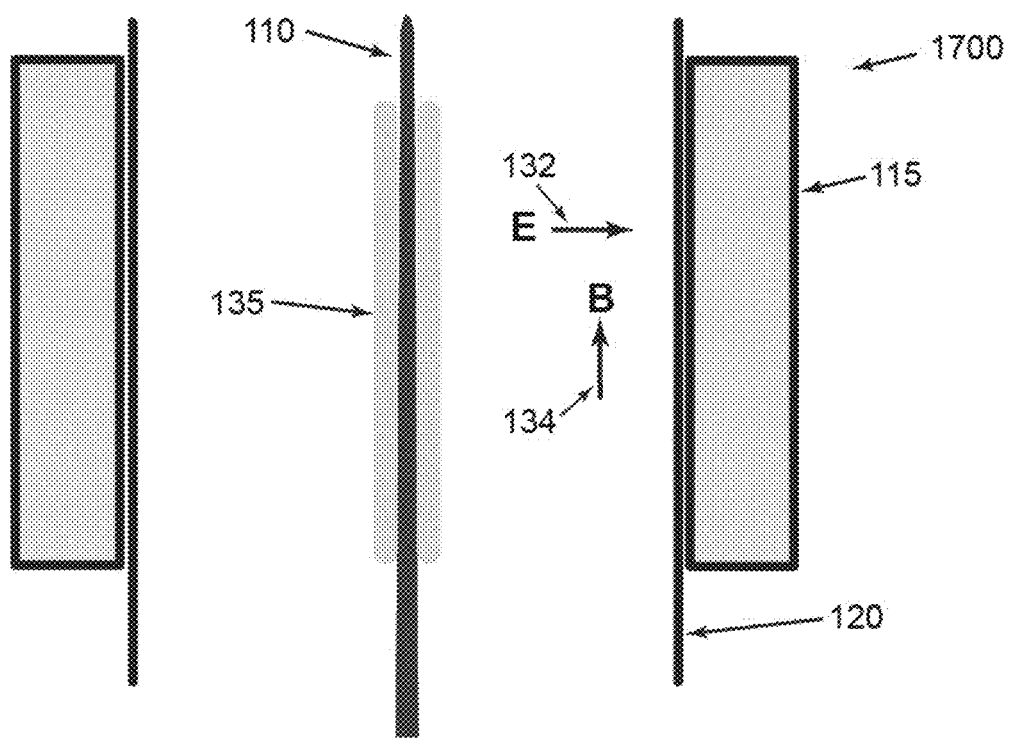
FIG. 17 is a schematic diagram illustrating operation of a CCIG.

FIG. 17 illustrates operation of a CCIG. The gauge 1700 includes an anode 110 at a high voltage potential surrounded by a cathode 120 at ground potential. A pure electron plasma sheath 135 is shown around the anode 110. A magnet 115 provides a magnetic field 134 of sufficient strength, e.g., 500 to 1200 Gauss. The pure electron plasma requires strictly perpendicular magnetic 134 and electric fields 132. In the example shown, the electric field 132 is oriented radially and the magnetic field 134 is oriented axially. As expected, the electron sheath is presented only in areas where both the proper magnetic and electric field strengths and orientations are present.

Figure 18:
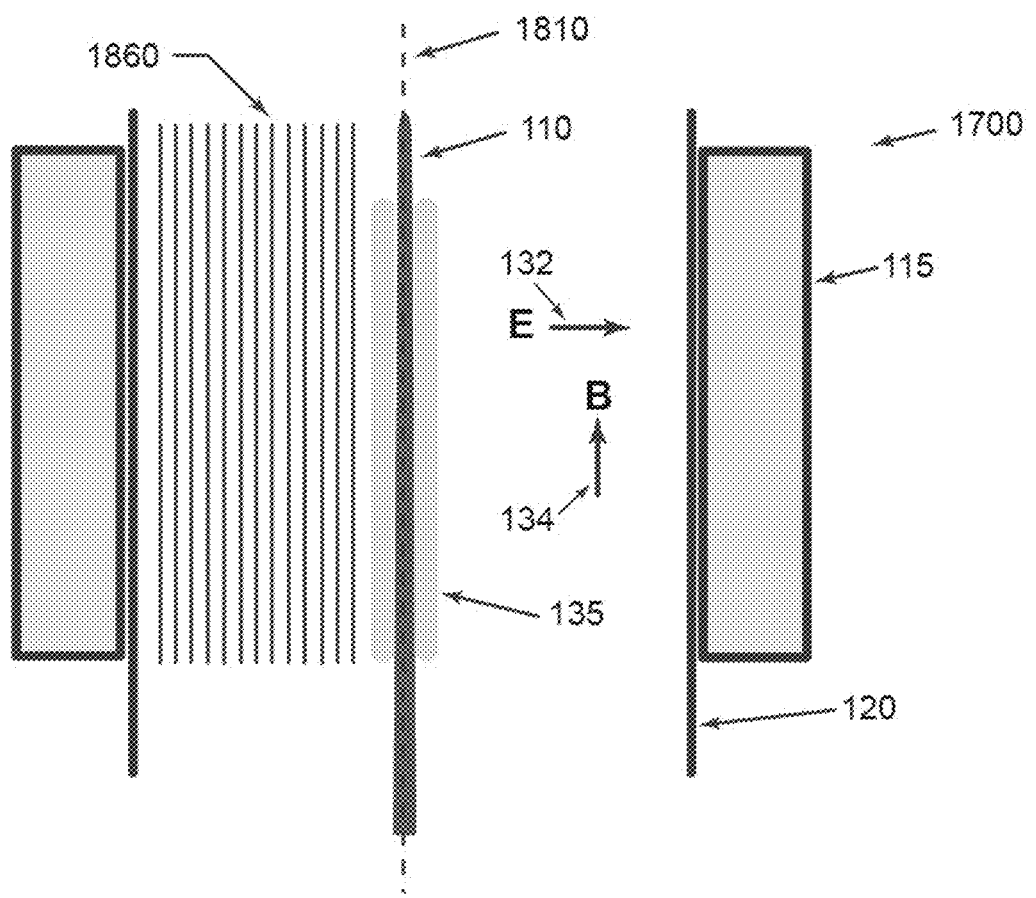
FIG. 18 illustrates equipotential lines according to an ideal model for pure electron plasma in the gauge of FIG. 17.

FIG. 18 is a schematic illustration of an ideal model for pure electron plasma in the gauge 1700 of FIG. 17. An axial magnetic field 134 is provided by the magnet 115 to support the pure electron sheath 135 around anode 110. As shown, the pure electron plasma sheath 135 is confined to the magnet volume. Equipotential lines 1860 are parallel to the anode axis 1810 for the electric field 132. The electric field 132 (E) is perpendicular to the equipotential lines. Electrons experiencing axial components of electric field (i.e., in regions with radial equipotential lines) are lost from the plasma discharge as described next.

Figure 19:
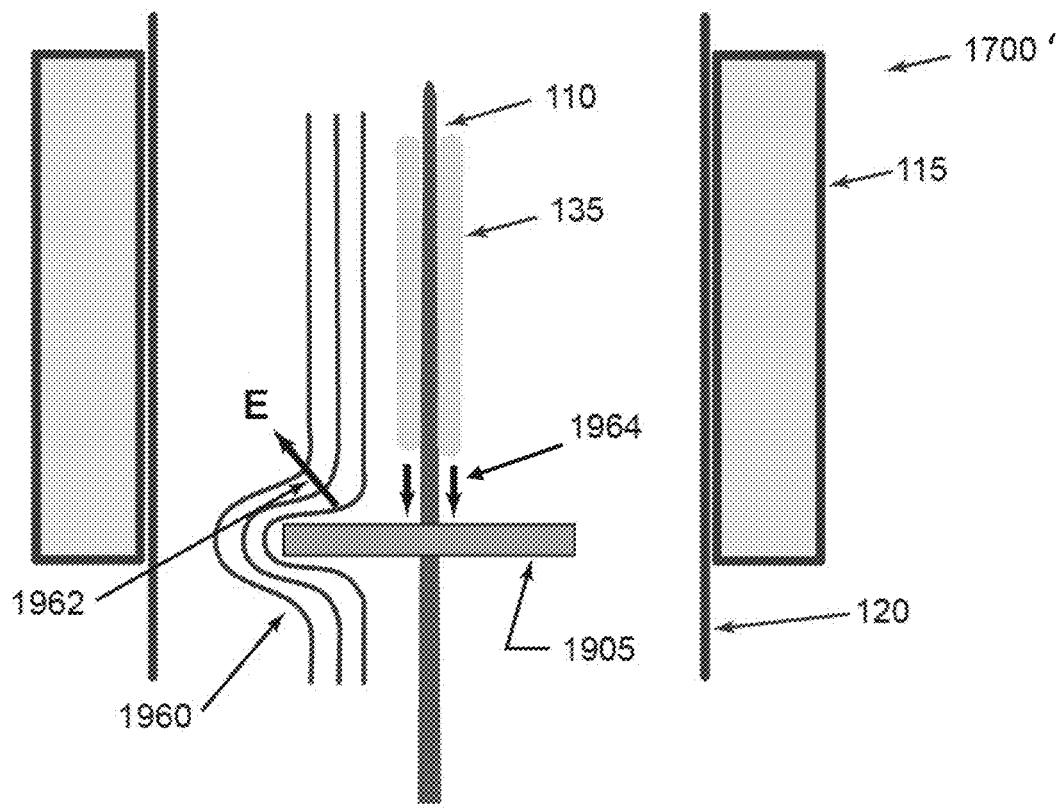
FIG. 19 illustrates equipotential lines in the gauge of FIG. 18 where a conductive disk has been added at the anode.

FIG. 19 illustrates a gauge 1700' that is gauge 1700 of FIG. 17 with the addition of a conductive plate, e.g., disk, 1905, that is electrically connected to the anode (anode biased conductive disk). As shown in the example, the conductive disk 1905 produces equipotentials 1960 that result in field lines E with axial components illustrated at 1962. Electrons are lost (1964) from electron sheath 135 in the area of the field lines with axial components as there is no longer confinement from the crossed magnetic and electric fields.

Figure 20:
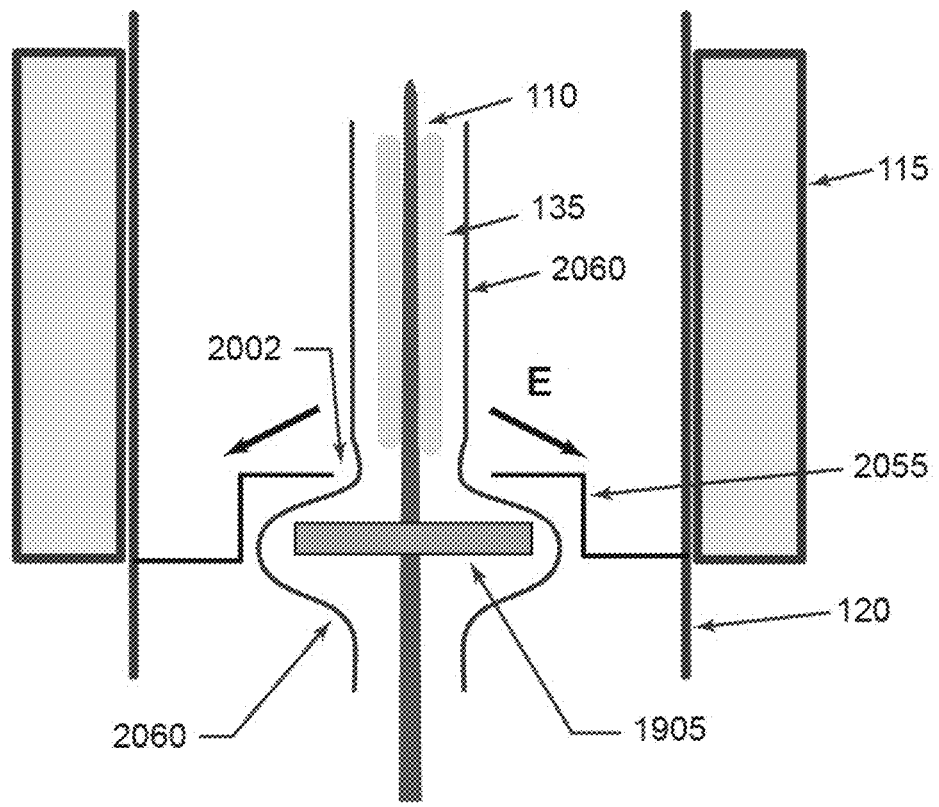
FIG. 20 illustrates an example shield that can be employed to improve the performance of the gauge of FIG. 19.
Figure 21:
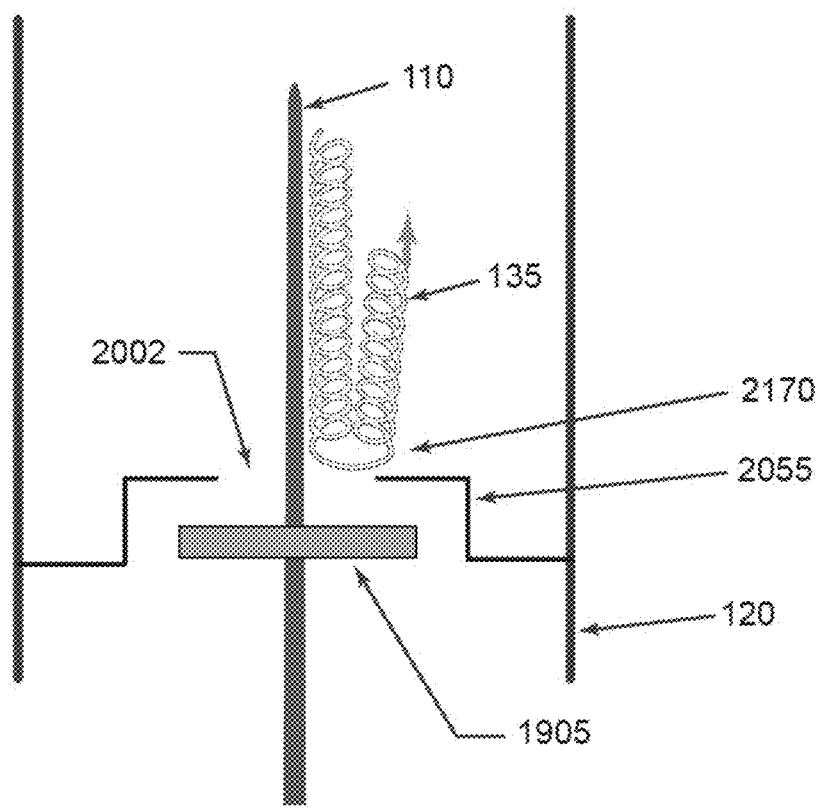
FIG. 21 illustrates further details of electron movement due to the shield of FIG. 20.

FIGS. 20 and 21 illustrate an example discharge control shield 2055 that can be employed to improve the performance of a gauge of FIG. 19. As shown, the discharge control shield 2055 is coupled to the cathode 120 and is positioned above the disk 1905, which is an anode biased conductive disk. The anode 110 extends through an aperture 2002 in the shield 2055. The shield effectively hides the disk 1905 from the discharge sheath (electron sheath) 135. In the region of the shield, the equipotential lines 2060 are pinched. Electron field lines above the shield in the pinched region have a downwardly directed component and thus drive electrons upward. As illustrated in FIG. 21, electrons 2170 that get close to the discharge control shield 2055 are folded back up and remain confined by the perpendicular electric and magnetic fields (E×B). The top of the discharge control shield is essentially a turnaround point for the electrons. The aperture 2002 in the shield pinches the equipotential lines, effectively reversing the axial components of electric field. Electrons reaching the discharge control shield are rejected and pushed back into the discharge region 135.

Figure 22:
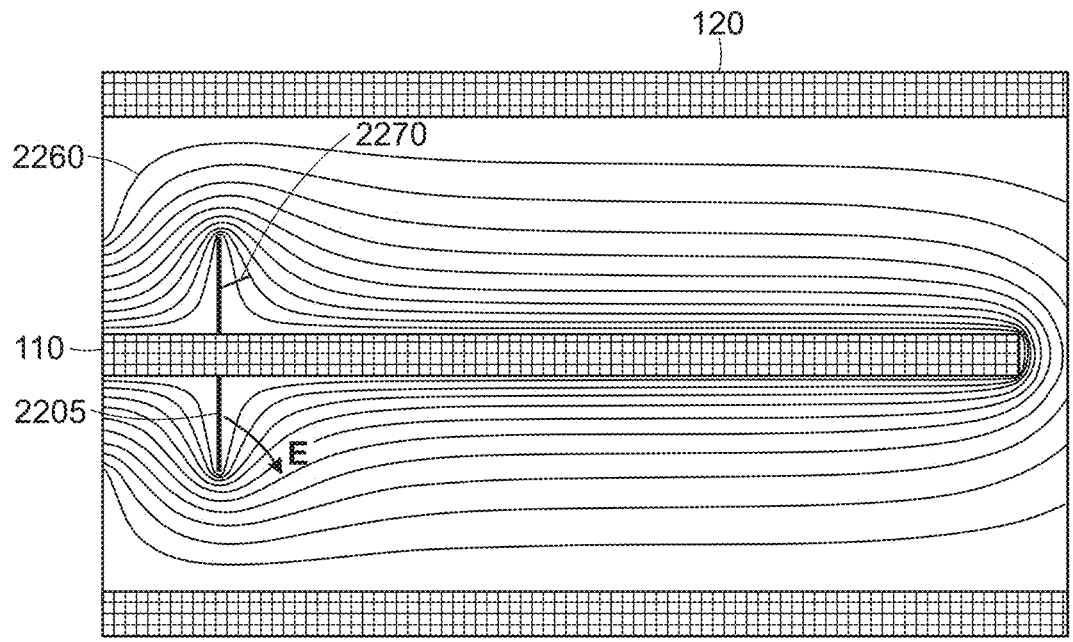
FIGS. 22 and 23 are diagrams illustrating example simulation results including equipotentials and their effect on electron movement.
Figure 23:
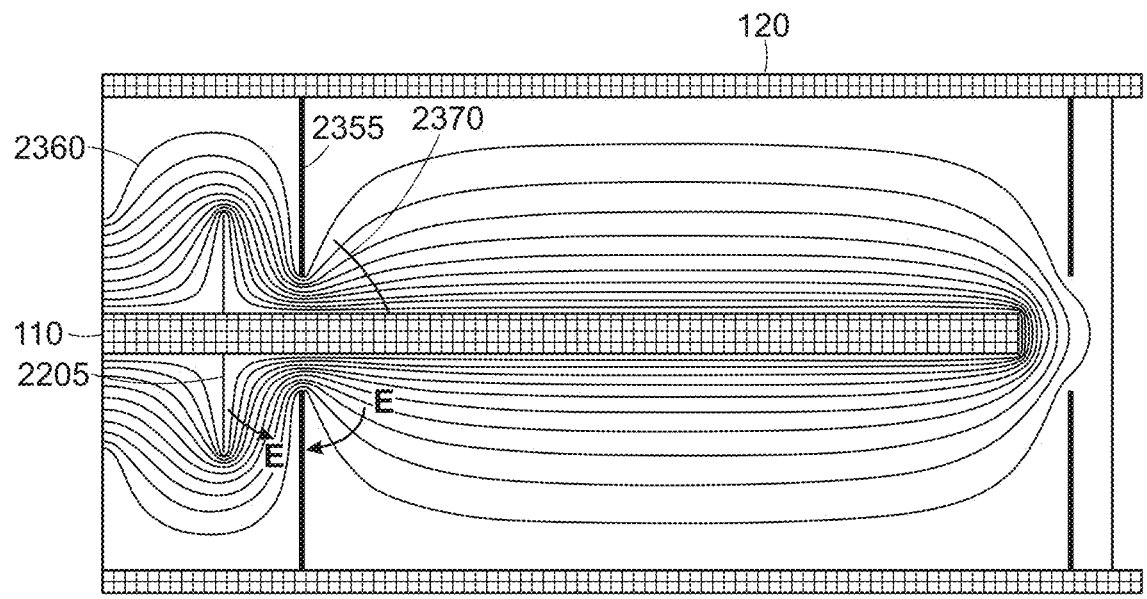

FIGS. 22 and 23 are diagrams illustrating simulation results (using SIMION models) showing equipotentials 2260, 2360 and their effect on a common electron 2270, 2370. In both figures, the anode plate 2205, which can be a disk, represents a metal coated ceramic feedthrough or a top washer or cup on a feedthrough, such as described elsewhere herein. A cathode 120 at a ground potential surrounds an extended anode 110 that is at a high voltage potential.

FIG. 22 shows what happens in the absence of a shield. In that case, the electron 2270 is directed towards the plate 2205 and cannot be stopped by the magnetic field.

As illustrated in FIG. 23, with the shield 2355 in place, the electron 2370 is folded back up and cannot see the anode-biased plate 2205 at the bottom of the gauge (left side of the figure). The figure clearly illustrates the pinching effect that the shield 2355 has on the equipotential lines 2360. The concept here is that the shield is pinching the bundle of equipotential lines, which reverses the field from pointing to the right (away from the plate 2205) as shown in FIG. 22, driving electrons into the plate, to pointing to the left as shown in FIG. 23 toward the cathode shield 2355, driving electrons back into the electron sheath.

Figure 24B:
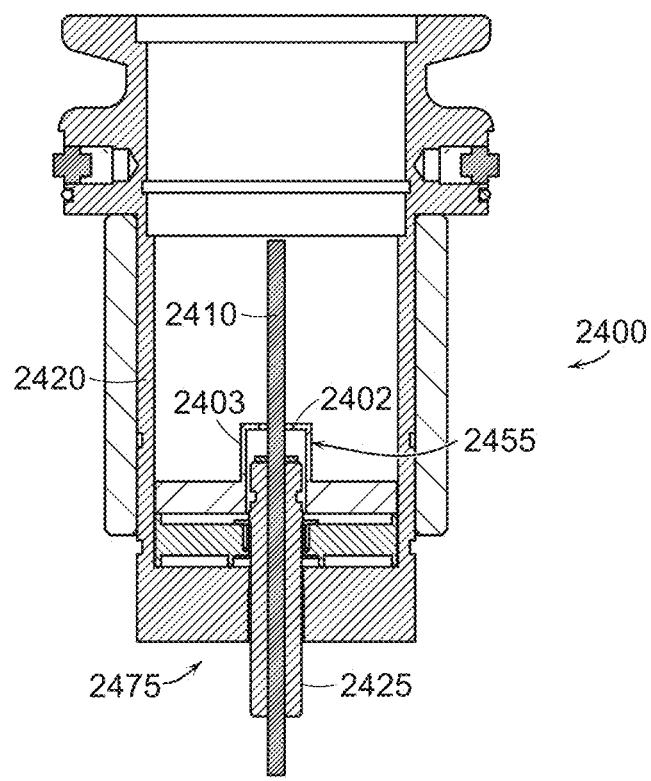
FIG. 24A and FIG. 24B are top and sectional views, respectively, of a CCIG including a shield according to an example embodiment of the invention.
Figure 24A:
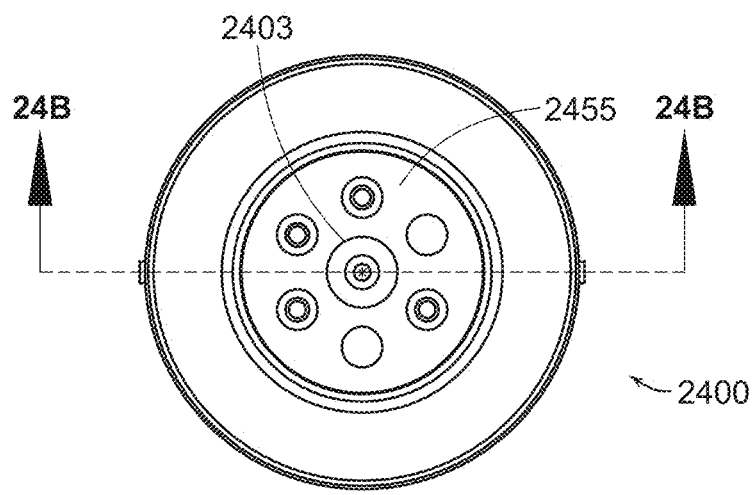

An embodiment of a CCIG 2400 employing a shield 2455 is shown in FIGS. 24A and 24B. The CCIG 2400 includes an anode 2410 supported by feedthrough insulator 2425 of feedthrough assembly 2475. A length of the anode 2410 is surrounded by cathode 2420. The shield 2455, which includes a central cup portion 2403 having aperture 2402, is positioned above the insulator 2425.

Figure 25B:
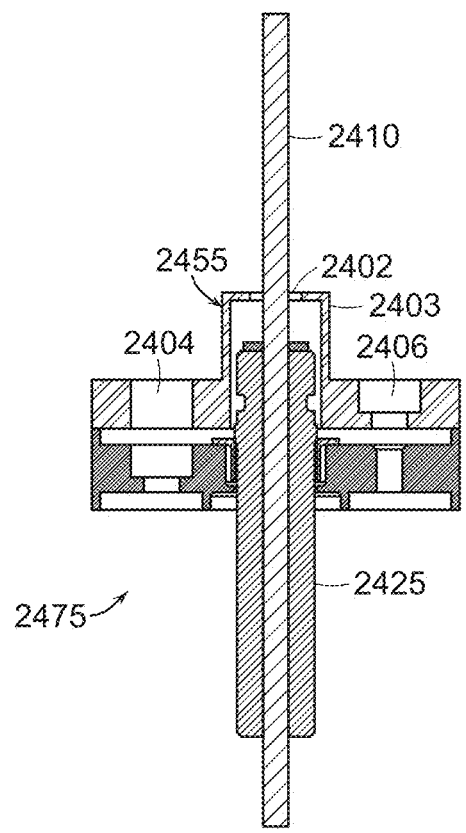
FIG. 25A and FIG. 25B are top and sectional views, respectively, of the feedthrough and shield of the gauge of FIGS. 24A-24B.
Figure 25A:
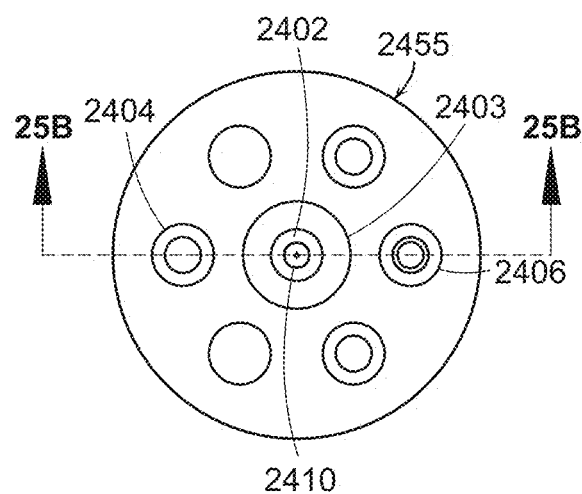

FIGS. 25A and 25B show detailed views of the feedthrough assembly 2475 of FIGS. 24A-B. The shield 2455 includes the central aperture 2402 in cup portion 2403 and through-holes, e.g., holes 2404, 2406, for mounting and venting. The through-holes are spaced about the central aperture 2402. The anode 2410 extends through the aperture 2402 and is spaced from the shield 2455.

Embodiments of the invention may be implemented in gauges having a housing formed of a polymer material, such as the housings described in U.S. patent application Ser. No. 14/994,969 to Kelly et al., published on Jul. 21, 2016 as US 2016/0209288 A1, and incorporated herein by reference in its entirety.

CCIGs are typically limited to operation in very low pressure ranges below $10^{-2}$ Torr. To measure pressure over ranges that extend as high as atmospheric pressure (760 Torr), they may be combined with higher pressure gauges such as resistance or diaphragm gauges.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A cold cathode ionization gauge (CCIG) comprising:
   an extended anode;
   a cathode surrounding the anode along a length of the anode, the cathode forming a discharge space around the anode to enable formation of a plasma between the anode and the cathode and a resultant ion current flow into the cathode, the cathode comprising a base plate having a base surface that forms a surface of the discharge space;
   a magnet applying a magnetic field through the discharge space to lengthen free electron paths to sustain the plasma;
   a feedthrough insulator supporting the anode, the insulator extending through the base surface;
   a shield mounted to the base surface of the cathode and surrounding and spaced from the anode, the shield electrically isolated from the insulator and shielding the insulator from electrons of the plasma, wherein the shield is spaced from the anode by a first spacing, the shield spaced from the insulator by a second spacing greater than the first spacing, the first and second spacings enabling shielding of the insulator from electrons of the plasma, the shielding including reflecting the electrons to diminish electron loss at a transition area from the anode to the insulator; and an electric controller that applies voltage between the anode and the cathode to create ionization with plasma discharge between the anode and the cathode, the controller determining pressure based on measured ion current flow to the cathode.

2. The CCIG of claim 1 wherein the second spacing between the shield and the insulator is within a range of 0.9 to 2.7 millimeters.

3. The CCIG of claim 1 wherein the shield comprises a plate having an aperture through which the anode extends.

4. The CCIG of claim 3 wherein the aperture in the plate is circular and the first spacing is determined by the radius of the aperture.

5. The CCIG of claim 3 wherein the shield further comprises a spacer adapted to provide the second spacing between the plate and the insulator.

6. The CCIG of claim 5 wherein the spacer includes a leg that connects the shield to the cathode.

7. The CCIG of claim 6 wherein the spacer includes multiple legs that connect the shield to the cathode.

8. The CCIG of claim 3 wherein the shield comprises a cup that surrounds the insulator, and wherein the plate having the aperture is the base of the cup.

9. The CCIG of claim 8 wherein the aperture is circular and the first spacing is determined by the radius of the aperture.

10. The CCIG of claim 1 wherein a top portion of the insulator is covered with metal at anode potential.

11. The CCIG of claim 1 wherein the cathode includes a cylindrical side wall extending from the base plate, the base plate surrounding and being coupled to the insulator.

12. The CCIG of claim 1 wherein the first spacing between the shield and the anode is within a range of 0.9 to 2.7 millimeters.

13. A method of measuring pressure comprising:
applying a magnetic field to a discharge space between an anode and a cathode, the cathode comprising a base plate having a base surface that forms a surface of the discharge space;
releasing electrons into the discharge space to create a plasma discharge in the discharge space and ion current flow to the cathode;
with a shield mounted to the base surface of the cathode, shielding a feedthrough insulator supporting the anode from electrons of the plasma discharge, the insulator extending through the base surface, wherein the shield is spaced from the anode by a first spacing, the shield spaced from the insulator by a second spacing greater than the first spacing, the first and second spacings enabling shielding of the insulator from electrons of the plasma, the shielding including reflecting electrons to diminish electron loss at a transition area from the anode to the insulator; and
determining pressure based on measured ion current flow to the cathode.

14. The method of claim 13 wherein the first spacing between the shield and the anode is within a range of 0.9 to 2.7 millimeters.

15. The method of claim 13 wherein a top portion of the insulator is covered with metal at anode potential.

16. A cold cathode ionization gauge (CCIG) comprising:
an extended anode;
a cathode surrounding the anode along a length of the anode, the cathode forming a discharge space around the anode to enable formation of a plasma between the anode and the cathode and a resultant ion current flow into the cathode, the cathode comprising a base plate and a side wall extending from the base plate, the base plate forming a surface of the discharge space;
a magnet applying a magnetic field through the discharge space to lengthen free electron paths to sustain the plasma;
a feedthrough insulator supporting the anode;
metal on the insulator surrounding the anode and at anode potential and facing the discharge space;
a shield plate mounted to the base plate over a base plate aperture, the shield plate defining a shield aperture above the insulator and through which the anode extends, the aperture dimensioned such that there is an electric field from the anode potential at the metal on the insulator directly to the cathode at a cathode potential with no electric field above the metal and shield aperture to draw electrons into the metal from the plasma; and
an electric controller that applies voltage between the anode and the cathode to create ionization with plasma discharge between the anode and the cathode, the controller determining pressure based on measured ion current flow to the cathode.

17. The CCIG of claim 16 wherein the shield plate is spaced from the anode by a first spacing provided at the shield aperture, the shield plate being spaced from the insulator at the shield aperture by a second spacing greater than the first spacing.

18. The CCIG of claim 17 wherein the shield aperture is circular and the first spacing is determined by the radius of the shield aperture.

19. The CCIG of claim 17 wherein the first spacing between the shield plate and the anode is within a range of 0.9 to 2.7 millimeters.

20. The CCIG of claim 17 wherein the second spacing between the shield plate and the insulator is within a range of 0.9 to 2.7 millimeters.

21. The CCIG of claim 16 wherein the side wall is cylindrical.

22. A cold cathode ionization gauge (CCIG) comprising:
an extended anode;
a cathode surrounding the anode along a length of the anode, the cathode forming a discharge space around the anode to enable formation of a plasma between the anode and the cathode and a resultant ion current flow into the cathode, the cathode comprising a base plate and a side wall extending from the base plate, the base plate forming a surface of the discharge space;
a magnet applying a magnetic field through the discharge space to lengthen free electron paths to sustain the plasma;
a feedthrough insulator supporting the anode;
metal on the insulator surrounding the anode and at anode potential and facing the discharge space;
a shield plate suspended across a base plate aperture in the base plate, the shield plate defining a shield aperture above the insulator and through which the anode extends, the aperture dimensioned such that there is an electric field from the anode potential at the metal on the insulator directly to the cathode at a cathode potential with no electric field above the metal and shield aperture to draw electrons into the metal from the plasma; and
an electric controller that applies voltage between the anode and the cathode to create ionization with plasma discharge between the anode and the cathode, the controller determining pressure based on measured ion current flow to the cathode.

\* \* \* \* \*